(12) United States Patent
Atchison et al.

(10) Patent No.: US 10,830,479 B2
(45) Date of Patent: Nov. 10, 2020

(54) HVAC ZONE SCHEDULE MANAGEMENT SYSTEMS AND METHODS

(71) Applicant: Johnson Controls Technology Company, Auburn Hills, MI (US)

(72) Inventors: Shaun B. Atchison, Wichita, KS (US); Theresa N. Gillette, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 59 days.

(21) Appl. No.: 15/991,965

(22) Filed: May 29, 2018

(65) Prior Publication Data

US 2019/0353381 A1    Nov. 21, 2019

Related U.S. Application Data

(60) Provisional application No. 62/673,385, filed on May 18, 2018.

(51) Int. Cl.

| | | |
|---|---|---|
| F24F 11/59 | (2018.01) | |
| F24F 11/61 | (2018.01) | |
| F24F 11/54 | (2018.01) | |
| F24F 120/20 | (2018.01) | |
| F24F 110/10 | (2018.01) | |
| F24F 11/523 | (2018.01) | |

(52) U.S. Cl.
CPC ............ *F24F 11/59* (2018.01); *F24F 11/523* (2018.01); *F24F 11/54* (2018.01); *F24F 11/61* (2018.01); *F24F 2110/10* (2018.01); *F24F 2120/20* (2018.01)

(58) Field of Classification Search
CPC .... F24F 11/56; F24F 2110/10; F24F 2120/20; G05B 15/02; G05B 2219/2642; G05B 13/041; G05B 2219/2614; G05B 2219/23377; G05B 2219/23385; G05D 23/1905; G05D 23/1902; G05D 23/00; G05D 23/1934; H04L 12/2803; H04L 12/2809; H04L 12/2816; H04L 63/10; G06F 3/04847; G06F 15/17
See application file for complete search history.

(56) References Cited

U.S. PATENT DOCUMENTS 6,349,883 B1    2/2002  Simmons et al.
6,574,581 B1    6/2003  Bohrer et al.
(Continued)

FOREIGN PATENT DOCUMENTS

WO    2011128416 A2    11/2011
WO    2016148651 A1    9/2016
WO    2016182891 A1    11/2016

*Primary Examiner* — Darrin D Dunn
(74) *Attorney, Agent, or Firm* — Fletcher Yoder, P.C.

(57) ABSTRACT

The present disclosure includes a heating, ventilation, and air conditioning (HVAC) system having a control system suitable to control operation of a device in the HVAC system. The control system may include a zone control panel that may maintain an instance of each schedule used by one or more devices in the HVAC system to operate. Further, the zone control panel may include a set of one or more status flags, which may each indicate whether data associated with a respective flag is available to be retrieved. Accordingly, the zone control panel may communicate information, such as an update to a schedule, rapidly between devices in the HVAC system.

20 Claims, 11 Drawing Sheets

(56) References Cited

U.S. PATENT DOCUMENTS

| | | | |
|---|---|---|---|
| 6,595,430 B1 * | 7/2003 | Shah | G05B 15/02 |
| | | | 236/46 R |
| 6,851,621 B1 * | 2/2005 | Wacker | G05D 23/1905 |
| | | | 236/51 |
| 6,983,889 B2 | 1/2006 | Alles | |
| 7,083,109 B2 | 8/2006 | Pouchak | |
| 7,156,316 B2 | 1/2007 | Kates | |
| 7,349,761 B1 | 3/2008 | Cruse | |
| 7,455,236 B2 | 11/2008 | Kates | |
| 7,983,796 B2 | 7/2011 | Kassel | |
| 8,020,777 B2 * | 9/2011 | Kates | F24D 19/1084 |
| | | | 165/208 |
| 8,260,471 B2 | 9/2012 | Storch et al. | |
| 8,374,725 B1 | 2/2013 | Ols | |
| 8,600,559 B2 | 12/2013 | Grohman et al. | |
| 8,660,708 B2 | 2/2014 | Narayanamurthy et al. | |
| 8,880,226 B2 | 11/2014 | Raman et al. | |
| 9,175,867 B2 | 11/2015 | Grohman | |
| 9,176,491 B2 | 11/2015 | Dyess | |
| 9,303,889 B2 * | 4/2016 | Kates | G05D 23/1934 |
| 9,338,238 B2 | 5/2016 | Spears et al. | |
| 9,443,043 B1 | 9/2016 | Koop | |
| 9,489,062 B2 * | 11/2016 | Corcoran | H04L 12/2818 |
| 9,574,786 B2 | 2/2017 | Daubman et al. | |
| 9,638,978 B2 | 5/2017 | Brown et al. | |
| 9,714,771 B1 * | 7/2017 | Goodman | F24F 11/30 |
| 9,715,368 B2 | 7/2017 | Gazdzinski | |
| 9,766,645 B2 * | 9/2017 | Imes | F24F 11/63 |
| 9,800,463 B2 | 10/2017 | Imes et al. | |
| 10,253,998 B1 * | 4/2019 | Goodman | F24F 11/30 |
| 2005/0270151 A1 * | 12/2005 | Winick | H04L 12/2818 |
| | | | 340/539.1 |
| 2006/0028212 A1 | 2/2006 | Steiner et al. | |
| 2008/0033599 A1 * | 2/2008 | Aminpour | F24F 11/30 |
| | | | 700/276 |
| 2009/0062964 A1 * | 3/2009 | Sullivan | G05B 15/02 |
| | | | 700/276 |
| 2010/0000094 A1 * | 1/2010 | Lombardo | B25F 5/021 |
| | | | 30/123 |
| 2012/0221956 A1 * | 8/2012 | Geadelmann | G05B 15/02 |
| | | | 715/736 |
| 2012/0233478 A1 * | 9/2012 | Mucignat | G06F 1/3209 |
| | | | 713/320 |
| 2012/0239221 A1 * | 9/2012 | Mighdoll | G05D 23/1902 |
| | | | 700/300 |
| 2012/0298763 A1 * | 11/2012 | Young | F24F 11/30 |
| | | | 236/51 |
| 2013/0087628 A1 * | 4/2013 | Nelson | G05D 23/1934 |
| | | | 236/51 |
| 2013/0231792 A1 | 9/2013 | Ji et al. | |
| 2013/0238830 A1 | 9/2013 | Pouchak et al. | |
| 2013/0334326 A1 | 12/2013 | Shan | |
| 2014/0188290 A1 * | 7/2014 | Steinberg | G05B 19/0426 |
| | | | 700/278 |
| 2014/0316585 A1 * | 10/2014 | Boesveld | G05D 23/1902 |
| | | | 700/278 |
| 2014/0319232 A1 * | 10/2014 | Gourlay | G05D 23/1905 |
| | | | 236/51 |
| 2014/0349566 A1 * | 11/2014 | Lamb | F24F 11/76 |
| | | | 454/255 |
| 2015/0204564 A1 * | 7/2015 | Shah | G05B 15/02 |
| | | | 700/278 |
| 2015/0354844 A1 * | 12/2015 | Kates | F24F 11/30 |
| | | | 236/1 B |
| 2015/0369503 A1 | 12/2015 | Flaherty et al. | |
| 2016/0054027 A1 * | 2/2016 | Dyess | G05B 15/02 |
| | | | 700/277 |
| 2016/0085553 A1 * | 3/2016 | Long | G06F 9/46 |
| | | | 712/229 |
| 2016/0091220 A1 * | 3/2016 | Kates | G05D 23/1934 |
| | | | 236/1 B |
| 2016/0139582 A1 * | 5/2016 | Matsuoka | G05D 23/1917 |
| | | | 700/276 |
| 2016/0209062 A1 | 7/2016 | Castillo et al. | |
| 2016/0357199 A1 | 12/2016 | Matlock | |
| 2017/0153035 A1 * | 6/2017 | Sartain | G05B 15/02 |
| 2017/0262958 A1 * | 9/2017 | Pangam | G06F 9/445 |
| 2017/0314797 A1 | 11/2017 | Blair et al. | |
| 2018/0004178 A1 | 1/2018 | Haines et al. | |
| 2018/0038606 A1 * | 2/2018 | Chakravarty | F24F 11/30 |
| 2018/0087793 A1 * | 3/2018 | Okita | F24F 11/30 |
| 2018/0156486 A1 * | 6/2018 | Tessier | G05B 13/02 |
| 2018/0267794 A1 * | 9/2018 | Atchison | H04L 67/34 |
| 2018/0335976 A1 * | 11/2018 | DeRosa | G06F 3/0659 |
| 2018/0373401 A1 * | 12/2018 | Khiani | F24F 11/30 |
| 2019/0037024 A1 * | 1/2019 | Mighdoll | G05D 23/1902 |
| 2019/0154293 A1 * | 5/2019 | Heigl | F24F 11/89 |
| 2019/0227582 A1 * | 7/2019 | Steinberg | F24F 11/62 |
| 2019/0234641 A1 * | 8/2019 | Svendsen | F24F 11/30 |
| 2019/0301763 A1 * | 10/2019 | Hoffman | F24F 11/64 |
| 2020/0073419 A1 * | 3/2020 | Pickard | G05D 23/1934 |

* cited by examiner

HVAC ZONE SCHEDULE MANAGEMENT SYSTEMS AND METHODS

CROSS-REFERENCE TO RELATED APPLICATIONS

This application is a Non-Provisional Patent Application of U.S. Provisional Patent Application No. 62/673,385, entitled "HVAC Zone Schedule Management Systems and Methods", filed May 18, 2018, which is herein incorporated in its entirety for all purposes.

BACKGROUND

The present disclosure generally relates to heating, ventilation, and air conditioning (HVAC) systems and, more particularly, a control system that may be implemented in a HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system generally includes a control system to control and/or to coordinate operation of devices, such as equipment, machines, and sensors. For example, the control system may communicate sensor data and/or control commands with devices in the HVAC system. The control system may include a zone control panel or board, which may be communicatively coupled to one or more of the devices, for example, via dedicated one or more dedicated communication busses.

In some cases, devices, such as a thermostat, in different zones of the HVAC system may operate according to a schedule associated with a respective zone. However, because a zone may include several devices operating on a respective schedule and/or because the HVAC system may include several zones, communicating updates to a schedule or a set of schedules to a set of suitable devices and/or zones may become increasingly difficult and/or may involve increased latency. Further, the zone control panel may periodically retrieve and/or receive information, such as information regarding an update to a schedule, from the devices via the dedicated communication busses.

However, at least in some instances, retrieving and/or receiving an increased amount of information may increase latency of communication within the control system, for example, between the zone control panel and another device, such as a zone thermostat. Accordingly, as the number of devices and/or complexity of the HVAC system increases, maintaining communication between devices implemented in the HVAC system may become increasingly cumbersome and/or resource intensive.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an HVAC system includes a first zone thermostat that operates based at least in part on a first schedule and stores a first instance of the first schedule. The HVAC system further includes a zone control panel communicatively coupled to the first zone thermostat. The zone control panel stores a second instance of the first schedule. Further, the HVAC system includes a second zone thermostat communicatively coupled to the zone control panel that operates based at least in part a second schedule. The second zone thermostat includes a first electronic display and a first microcontroller. The first microcontroller is programmed to, when a first user input requesting to view the first schedule used by the first zone thermostat is received at the second zone thermostat, instruct the second zone thermostat to retrieve the first schedule from the zone control panel and to store a third instance of the first schedule at the second zone thermostat. Further, when a first user input requesting to view the first schedule used by the first zone thermostat is received at the second zone thermostat, the first microcontroller is programmed to instruct the first electronic display to display a visual representation of the first schedule based at least in part on the third instance of the first schedule. When a second user input requesting to modify the first schedule is received at the second zone thermostat, the first microcontroller is programmed to instruct the second zone thermostat to update the third instance of the first schedule stored at the second zone thermostat based in part on the second user input and to instruct the second zone thermostat to output first information related to the second user input to facilitate updating each other instance of the first schedule used by the first zone thermostat stored in the HVAC system.

In another embodiment, a method for controlling operation of an HVAC system involves, when a first user input requesting to view a first schedule used by a first zone thermostat in the HVAC system that operates based in part on the first schedule stores a first instance of the first schedule is received at a second zone thermostat in the HVAC system, where the second zone thermostat is configured to operate based in part on a second schedule, instructing, using a first controller of the second zone thermostat, the second zone thermostat to retrieve the first schedule from a zone control panel in the HVAC system that stores a second instance of the first schedule and to store a third instance of the first schedule at the second zone thermostat. Further, when a first user input requesting to view a first schedule used by a first zone thermostat is received at the second zone thermostat, the method involves instructing, using the first controller, a first electronic display of the second zone thermostat to display a visual representation of the first schedule based at least in part on the third instance of the first schedule. When a second user input requesting to modify the first schedule is received at the second zone thermostat, the method involves instructing, using the first controller, the second zone thermostat to update the third instance of the first schedule stored at the second zone thermostat based in part on the second user input. Further, when a second user input requesting to modify the first schedule is received at the second zone thermostat, the method involves instructing, using the first controller, the second zone thermostat to output first information related to the second user input to facilitate updating each other instance of the first schedule used by the first zone thermostat stored in the HVAC system.

In another embodiment, a tangible, non-transitory, computer-readable medium, includes instructions executable by at least one processor of a zone control panel in an HVAC system that, when executed by the at least one processor, cause the at least one processor to, when a first input requesting to modify a first schedule is received at the zone control panel from a first zone thermostat in the HVAC system that operates based in part on a second schedule, update a first instance of the first schedule stored at the zone control panel based in part on the first input. Further, the instructions, when executed by the at least one processor, cause the at least one processor to, when the first input requesting to modify the first schedule is received at the zone control panel from the first zone thermostat, identify a second instance of the first schedule stored on a second zone thermostat in the HVAC system that operates based in part on the first schedule and output first information related to the first input to facilitate updating the second instance of the first schedule used by the second zone thermostat.

In another embodiment, an HVAC system includes a first zone thermostat that stores a first instance of a first set of data. The HVAC system further includes a zone control panel communicatively coupled to the first zone thermostat that stores a second instance of the first set of data. The zone control panel includes a first flag that, in a first state, indicates first information related to the first instance of the first set of data and that, in a second state, indicates second information related to the first instance of the first set of data. The zone control panel further includes a microcontroller programmed to determine a state of the first flag. When the first flag is in the second state, the microcontroller is programmed to instruct the zone control panel to retrieve the first instance of the first set of data from the first zone thermostat. Further, the when the first flag is in the second state, the microcontroller is programmed to update the second instance of the first set of data stored at the zone control panel based in part on the first instance of the first set of data retrieved from the first zone thermostat. The microcontroller is further programmed to, when the first flag is in the second state, instruct the zone control panel to operate based in part on the second instance of the first set of data after the second instance of the first set of data is updated and to update the state of the first flag from the second state to the first state.

In another embodiment, a method for controlling operation of an HVAC system involves determining, using a controller in the HVAC system, a state of a first flag. The first flag, in a first state, indicates first information related to a first instance of a first set of data stored at a first zone thermostat in the HVAC system and, in a second state, indicates second information related to the first instance of the first set of data. When the first flag is in the second state, the method involves instructing, using the controller, a zone control panel to retrieve the first instance of the first set of data from the first zone thermostat. Further, when the first flag is in the second state, the method involves updating, using the controller, a second instance of the first set of data stored at the zone control panel based in part on the first instance of the first set of data retrieved from the first zone thermostat. The method further involves, when the first flag is in the second state, instructing, using the controller, the zone control panel to operate based in part on the second instance of the first set of data after the second instance of the first set of data is updated and updating, using the controller, the state of the first flag from the second state to the first state.

In another embodiment, a tangible, non-transitory, computer-readable medium, includes instructions executable by at least one processor of a zone control panel in an HVAC system that, when executed by the at least one processor, cause the at least one processor to determine a state of a first flag at a first zone thermostat of the HVAC system. The first flag, in a first state, indicates first information related to a first instance of a first set of data stored at the first zone thermostat and, in a second state, indicates second information related to the first instance of the first set of data. When the first flag is in the second state, the instructions, when executed, cause the at least one processor to instruct the zone control panel to retrieve the first instance of the first set of data from the first zone thermostat and to update the second instance of the first set of data stored at the zone control panel based in part on the first instance of the first set of data retrieved from the first zone thermostat. Further, when the first flag is in the second state, the instructions, when executed, cause the at least one processor to instruct the zone control panel to operate based in part on the second instance of the first set of data after the second instance of the first set of data is updated and to update the state of the first flag from the second state to the first state.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
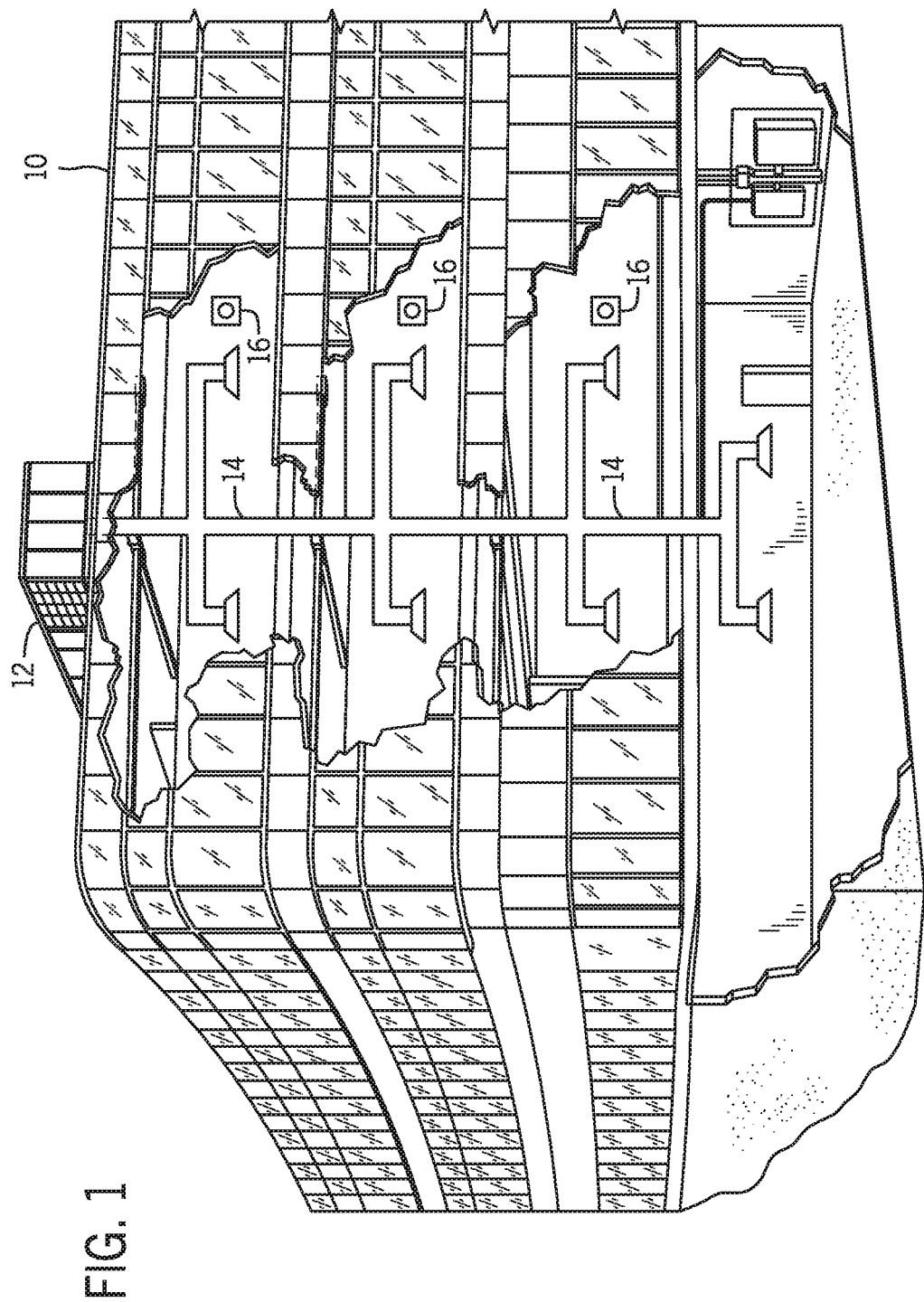
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems may utilize a control system to control the operation of devices or equipment within the HVAC system, for example, implemented via one or more zone control panels or panels. That is, a zone control panel may receive input data or signals from one or more devices in the HVAC system, such as an interface device, a thermostat, a sensor, another zone control panel, or any combination thereof. Additionally or alternatively, a zone control panel may output control commands or signals that instruct one or more other devices in the HVAC system to perform control actions. For example, a zone control panel may receive a call for conditioning, such as a call for heating, cooling, dehumidification, and/or the like, from a thermostat and may determine a control command to adjust operation of equipment in the HVAC system based on the received call for conditioning. The zone control panel may then transmit the control command to a thermostat and/or a device in the HVAC system communicatively coupled to the equipment so that the thermostat and/or the device may instruct the equipment to adjust operation.

Further, an interface device, such as a thermostat, in the HVAC system may operate according to a schedule. That is, for example, the setpoint for the HVAC system and/or for a zone in a building serviced by the HVAC system may be determined based on a time of day, a day of the week, and/or the like, as indicated by a schedule. As the HVAC system may include one or more zones, each zone in the HVAC system may operate on a respective schedule. More specifically, each interface device, such as a zone thermostat, associated with a zone may operate according to a respective schedule specific to the zone, which may be stored in memory of the interface device.

To set and/or adjust a schedule, a user may interact with an interface device using one or more input structures, such as a touch screen display. To that end, from a first interface device in a first zone, a user may adjust a first schedule the first interface device uses during operation and/or may adjust a second schedule used by a second interface device, which may be associated with a second zone. Accordingly, in addition to or as an alternative to storing a schedule used by an interface device on the interface device, the zone control panel may maintain an instance or copy of the schedule, which, at least in some instances, may facilitate reducing latency involved with communicating schedule updates between interface devices.

To interface with a device in the HVAC system, the zone control panel may communicatively couple to the device via an input/output (I/O) port. Further, information, such as calls for heating, cooling, dehumidification, and/or the like, may periodically be communicated between the zone control panel and the device at a regular interval. However, to reduce the amount of information communicated between the zone control panel and the device and/or to reduce latency involved with communication between the zone control panel and the device, additional information, such as information related to a schedule, may be retrieved in response to a change in state of a flag, such as a status bit and/or a status register. That is, for example, in response to a change in the state of a flag, the zone control panel may retrieve additional information from a suitable interface device associated with and/or indicated by the flag.

Accordingly, the present disclosure provides techniques to facilitate improving operational flexibility of a control system, for example, by enabling a schedule to be accessed and/or adjusted from interface device in a zone associated with the schedule and/or from an interface device in a zone associated with a different schedule. More specifically, the zone control panel, which may be communicatively coupled between a set of devices, such as interface devices or thermostats, may maintain a centralized instance of each of the schedules available in the HVAC system so that interface device may access and/or modify a schedule with reduced latency.

Further, a set of one or more flags may facilitate improved communication of information, such as schedule data, between the zone control panel and a device by reducing the amount of communicated information. In this manner, the zone control panel may communicate information between devices effectively and may provide greater access to information available within the HVAC system to the devices in the HVAC system, thereby providing a control system in the HVAC system greater operational flexibility and/or lower latency.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
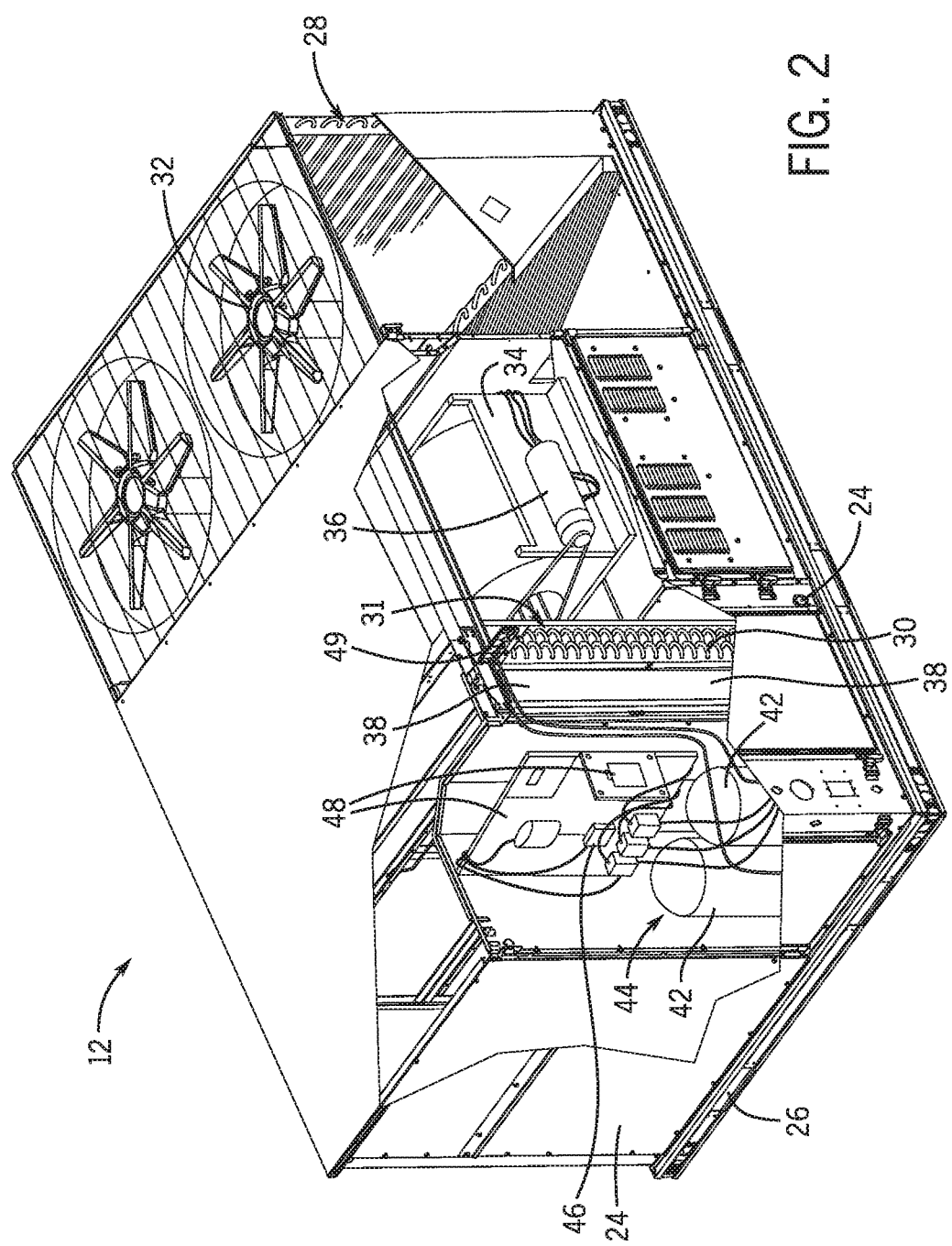
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and may provide structural support and/or protection to the internal components from environmental and/or other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements, such as rain, from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream.

In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 may draw air from the environment through the heat exchanger 28. Air may be heated and/or cooled as the air flows through the heat exchanger 28 before being released back to the environment surrounding the rooftop unit 12. A blower assembly 34, powered by a motor 36, may draw air through the heat exchanger 30 to heat or cool the air. The heated or cooled air may be directed to the building 10 by the ductwork 14, which may be connected to the HVAC unit 12. Before flowing through the heat exchanger 30, the conditioned air may flow through one or more filters 38 that may remove particulates and/or other contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 may increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
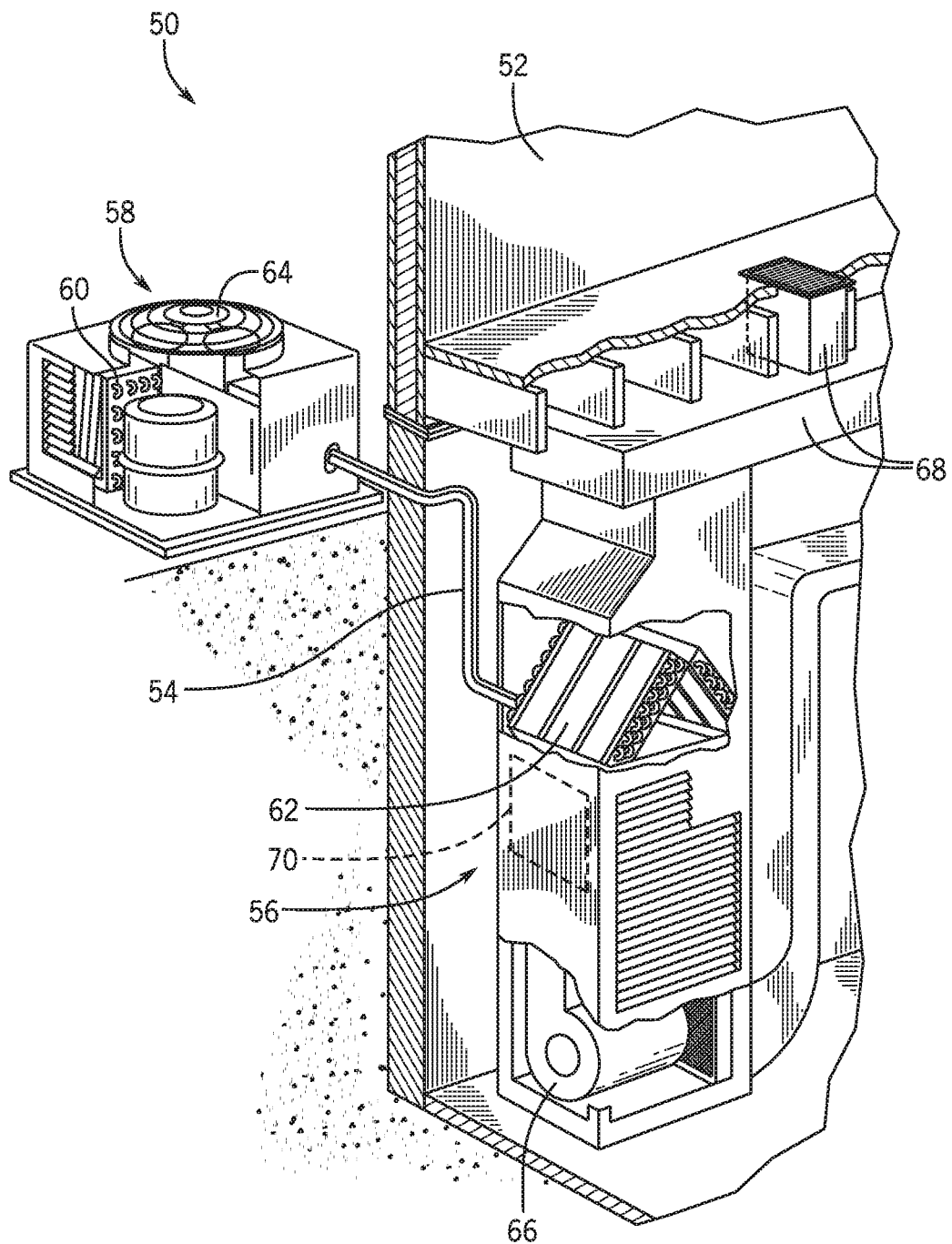
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor HVAC unit 56 to the outdoor HVAC unit 58. The indoor HVAC unit 56 may be positioned in a utility room, an attic, a basement, and/or the like. The outdoor HVAC unit 58 is typically situated adjacent to a side of residence 52 and is covered by a shroud to protect the system components and to reduce likelihood of leaves and/or other debris or contaminants from entering the unit. The refrigerant conduits 54 may transfer refrigerant between the indoor HVAC unit 56 and the outdoor HVAC unit 58, typically transferring primarily liquid refrigerant in one direction and primarily vaporized refrigerant in an opposite direction.

When the system shown in FIG. 3 is operating as an air conditioner, a heat exchanger 60 in the outdoor HVAC unit 58 may serve as a condenser for re-condensing vaporized refrigerant flowing from the indoor HVAC unit 56 to the outdoor HVAC unit 58 via one of the refrigerant conduits 54. In these applications, a heat exchanger 62 of the indoor unit may function as an evaporator. Specifically, the heat exchanger 62 receives liquid refrigerant, which may be expanded by an expansion device, and evaporates the refrigerant before returning it to the outdoor HVAC unit 58.

The outdoor HVAC unit 58 may draw environmental air through the heat exchanger 60 using a fan 64 and expel the air above the outdoor HVAC unit 58. When operating as an air conditioner, the air is heated by the heat exchanger 60 within the outdoor HVAC unit 58 exits the unit at a temperature higher than it entered. The indoor HVAC unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor HVAC unit 58 may serve as an evaporator to evaporate refrigerant, thereby cooling air entering the outdoor HVAC unit 58 as the air passes over outdoor the heat exchanger 60. The indoor heat exchanger 62 may receive a stream of air blown over it and heat the air by condensing the refrigerant.

In some embodiments, the indoor HVAC unit 56 may include a furnace system 70. For example, the indoor HVAC unit 56 may include the furnace system 70 when the residential heating and cooling system 50 is not implemented to operate as a heat pump. The furnace system 70 may include a burner assembly and heat exchanger, among other components, inside the indoor HVAC unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
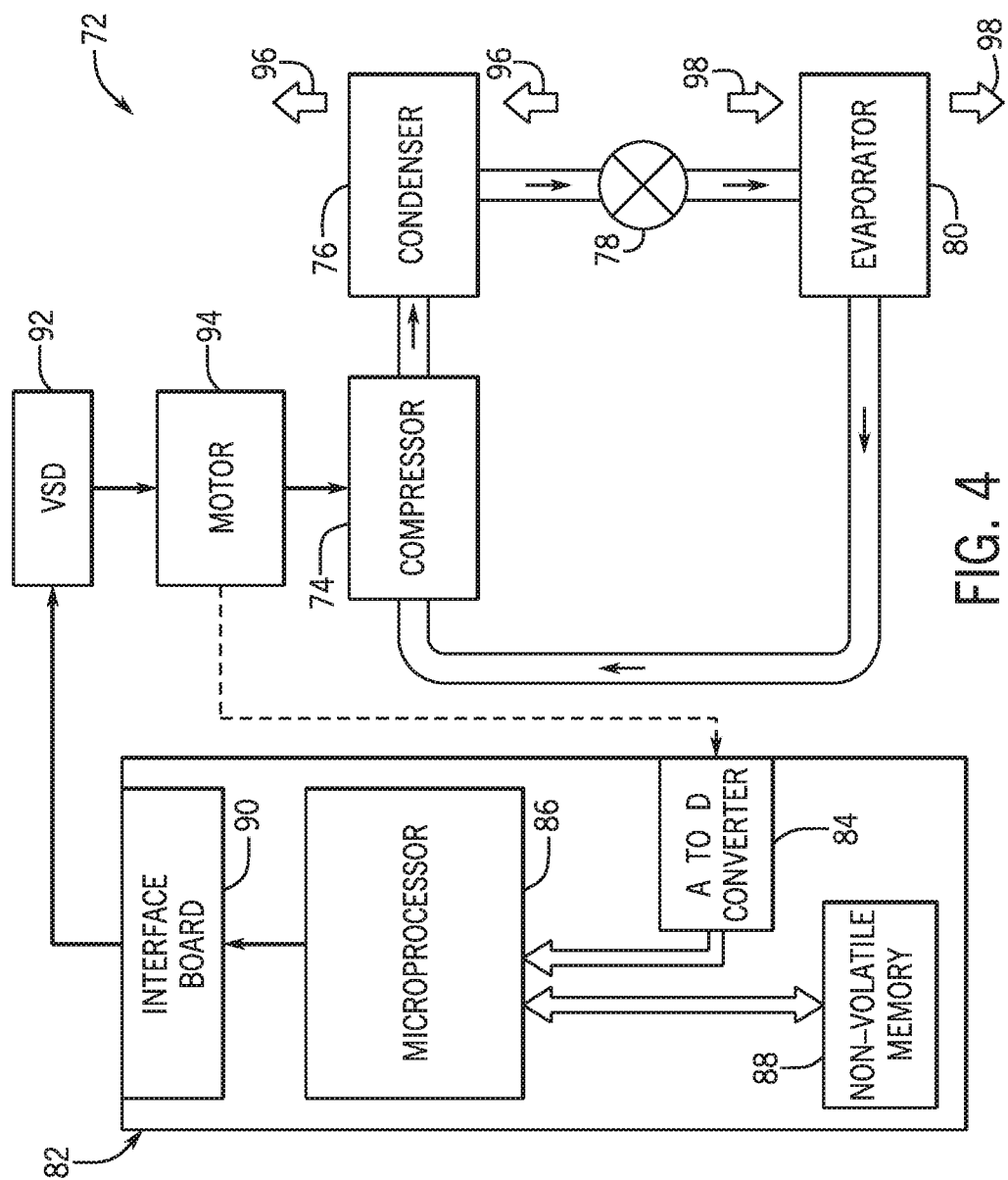
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, one or more expansion valves or devices 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. In some embodiments, the VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The techniques of the present disclosure may update features of the description above. In particular, as will be discussed in more detail below, one or more devices in a zone of an HVAC system may operate according to a respective schedule for the zone. Additionally, a centralized zone control panel, may maintain an instance of each of the schedules corresponding to one or more respective zones in the HVAC system, for example, to facilitate increasing operational flexibility and/or reducing communication latency in the HVAC system. Further, the zone control panel may facilitate reducing communication latency and/or reducing the amount of information communicated between devices in the HVAC system by using one or more status flags to indicate when updated information is available to be communicated.

Figure 5:
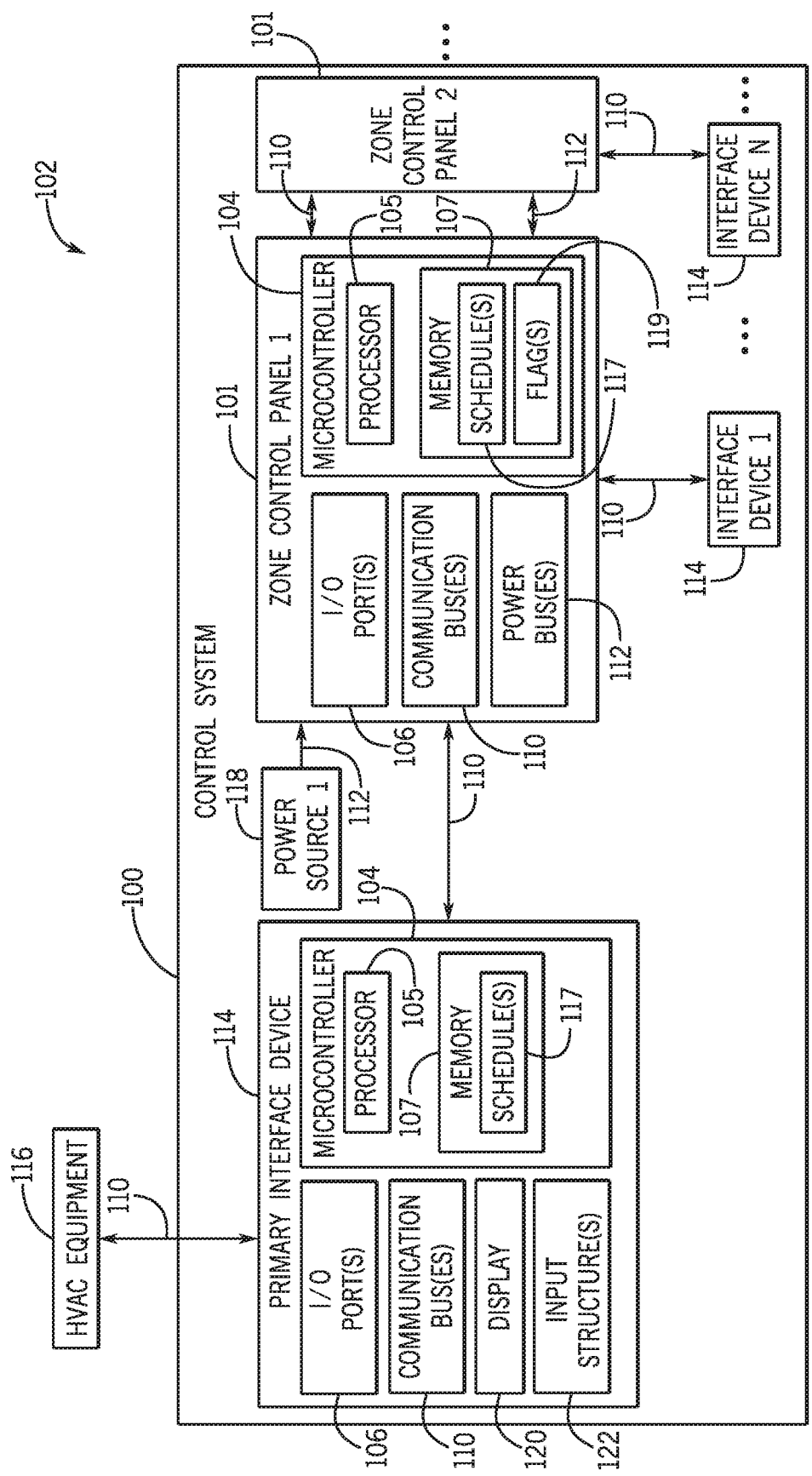
FIG. 5 is a block diagram of an example of the HVAC system of FIG. 1 that includes one or more devices operating according to a respective schedule, in accordance with an embodiment of the present disclosure.

To help illustrate, a control system 100 that includes a zone control panel 101 and an interface device 114, such as a thermostat or a zone thermostat, which may be used together to facilitate controlling operation of equipment in an HVAC system 102, is shown in FIG. 5. Each zone control panel 101 may include a microcontroller 104 and one or more input/output (I/O) ports 106, communication buses 110, and power buses 112. The microcontroller 104 may include a processor 105, such as microprocessor 86, and memory 107, such as non-volatile memory 88, to facilitate controlling operation of the HVAC system 102.

To facilitate controlling operation of the HVAC system 102, a zone control panel 101 may include one or more I/O ports 106 that may enable the zone control panel 101 to communicatively couple to an interface device 114 and/or another zone control panel 101, via an external communication bus 110. In some embodiments, an external communication bus 110 may include one or more off-board connections, such as wires and/or cables. Additionally, the I/O ports 106 may communicatively couple to the microcontroller 104 via internal or on-board communication buses 110. In some embodiments, an internal communication bus 110 may include one or more on-board connections, such as PCB traces. In this manner, the communication buses 110 may enable the zone control panel 101 to control operation of a device, an interface device 114 and/or another zone control panel 101. Further, to communicate over the communication bus 110, the microcontroller 104, the interface device 114, and/or the HVAC equipment 116 may follow a communication protocol, such as Recommended Standard 485 (RS-485), a serial transmission protocol, that may, for example, govern a data transmission rate and/or checksum data of transmitted data.

In some embodiments, the device may operate using electrical power. Thus, to facilitate controlling operation of a device, one or more of the I/O ports 106 on the zone control panel 101 may also facilitate conducting electrical power (e.g., 24 volt alternating current (VAC)) from a power source 118 to the device via one or more power busses 112. For example, the zone control panel 101 may receive electrical power from a power source 118, such as a transformer (e.g., an indoor transformer and/or an outdoor transformer), and/or another zone control panel 101 via external power buses 112 coupled to an I/O port 106.

In some embodiments, an external power bus 112 may include one or more off-board connections. Additionally, the zone control panel 101 may output electrical power to an interface device 114 and/or another zone control panel 101 via additional external power buses 112 coupled to its I/O ports 106. The zone control panel 101 may also route electrical power between its I/O ports 106 via internal power buses 112. In some embodiments, an internal power bus 112 may include one or more on-board connections.

Accordingly, the microcontroller 104 may communicate control commands instructing the HVAC equipment 116, such as a VSD 92, to perform a control action, such as adjust speed of motor, via an interface device 114, such as a master or primary thermostat. In some embodiments, the microcontroller 104 may determine control commands based on inputs received from an interface device 114 and/or operational parameters, such as speed, temperature, and/or pressure, indicated by sensors implemented in the HVAC equipment 116 and/or standalone sensors. For example, an interface device 114, such as a thermostat, may receive a user input to adjust the temperature setpoint of a zone and, in response, the zone control panel 101 may, if a sensed temperature in the zone is determined to be outside an acceptable range, determine a control command suitable to adjust the temperature of the zone to the temperature setpoint.

While not illustrated, the zone control panel 101 may additionally or alternatively be communicatively coupled to HVAC equipment 116 and/or other suitable devices in the HVAC system 102 via the one or more I/O ports 106. Further, the zone control panel 101 may route electrical power to the HVAC equipment 116 and/or the suitable device. Additionally or alternatively, the zone control panel 101 may communicate control commands directly to the HVAC equipment 116 and/or the suitable device. That is, it should be appreciated that FIG. 5 and its description are merely intended to be illustrative and not limiting.

In some embodiments, the interface device 114, such as a thermostat and/or a mobile device, may operate to receive a user input. Accordingly, the interface device 114 may include a display 120 and/or one or more input structures 122, such as a pushbutton, a keyboard, a mouse, and/or the like. The display may be an electronic display, such as a liquid crystal display (LCD), an organic light emitting diode (OLED) display, and/or the like.

In some embodiments, the size of the display 120 may vary between different interface devices 114 in the HVAC system 102. In such cases, a graphical interface and/or a layout of the schedule 117 presented on the respective displays 120 may vary to accommodate the different display sizes. That is, for example, a first interface device 114 may display the schedule with a first text size and a first number of options and/or actions available to interact with the schedule 117 while a second interface device 114 may display the schedule 117 with a second text size smaller than the first text size and with a second number of options and/or actions available to interact with the schedule 117. Further, as described in detail below, the options and/or actions available on the display 120 may depend on the size of the display.

The interface device 114 may determine one or more climate or air conditions, such as temperature, humidity, and/or the like, in an associated zone. To that end, the interface device 114 may include one or more sensors suitable to detect the one or more climate conditions and/or may communicatively couple to the one or more sensors to receive an input regarding the one or more climate conditions via, for example, one or more I/O ports 106.

In some embodiments, the interface device 114 may further include a microcontroller 104. Using the microcontroller 104, the interface device 114 may determine one or more calls or demands for conditioning in the zone. For example, based on a sensed temperature and a temperature setpoint, the interface device 114 may transmit a call for heating, cooling, dehumidification, a change in fan speed, and/or the like to adjust the actual temperature in the zone toward the temperature setpoint.

In some embodiments, the interface devices 114 may be implemented to form a control hierarchy. For example, an interface device 114 may operate as a primary or master interface device 114, while an additional interface device 114 may operate as a secondary or subordinate interface device 114. In some embodiments, the primary interface device 114 may handle coordination with and between the zone control panel 101 and the HVAC equipment 116. That is, for example, the primary interface device 114 may receive a control command from the zone control panel 101 and, based on the received control command, may control operation of the HVAC equipment.

Additionally, both the primary interface device 114 and the secondary interface device 114 may transmit information, such as calls for conditioning and/or sensed climate conditions for a respective zone, to the zone control panel 101. Further, in some embodiments, as will be described in greater detail below, the primary interface device 114 may provide additional options and/or control over information related to the configuration of the building zones, for example, compared to a secondary interface device 114.

Additionally, an interface device 114, such as a thermostat, may operate on a schedule 117. That is, for example, the interface device 114 may include a schedule 117, which may be stored in memory 107 on the interface device 114, that maps one or more climate condition setpoints for a zone to a time of day, a day of the week, a month of the year, and/or the like based on default settings and/or a user input. To that end, based in part on the schedule 117, the interface device 114 located in a zone may determine a scheduled setpoint for the zone corresponding to a current date and/or time in the zone. Based on the scheduled setpoint and the climate conditions present in a zone, the interface device 114 may then determine whether to transmit an input, such as a call for heating, cooling, dehumidification, a change in fan speed, and/or the like, to the zone control panel 101 to adjust one or more climate conditions of the zone.

While the schedule 117 is described above as mapping setpoints to a specific time or set of times, the schedule 117 may additionally or alternatively map information, such as a temperature difference between a setpoint and a sensed temperature that results in a call for conditioning, to a specific time or set of times. That is, for example, the schedule 117 may adjust the sensitivity with which the interface device 114 responds to deviations in climate conditions in a zone based on a time of day, a day of the week, and/or the like. In any case, the descriptions of the schedule 117 used herein are intended to be illustrative and not limiting.

In some embodiments, an interface device 114 may be initialized by a manufacturer, a system integrator, and/or a technician with a default schedule 117, which may be optimized based on one or more factors related to the zone and/or the HVAC system 102. For example, the default schedule 117 may be determined based on a configuration of the zone and/or the HVAC equipment 116 to reduce energy consumption in the HVAC system 102. Further, in some embodiments, a user of the HVAC system 102 may provide an input to the interface device 114 to modify the default schedule 117 and/or to create a new schedule 117 for the interface device 114 and/or the zone. To do so, the user may provide an input using the one or more input structures 122 and/or the display 120.

Further, in some embodiments, a user may modify a schedule 117 for a first interface device 114 in a first zone from a second interface device 114 in a second zone. That is, for example, a user may modify a schedule 117 corresponding to a zone from an interface device 114 separate and remote from the zone. In such cases, the second interface device 114 may access and modify an existing schedule 117 used by the first interface device 114 and/or create a new schedule 117 for the first interface device 114. To facilitate accessing and/or editing a schedule 117 corresponding to another zone and/or interface device 114, a set of the schedules 117 available in the HVAC system 102 may be stored centrally with respect to each of the interface devices 114.

In other words, in some embodiments, the zone control panel 101 may store a set of the schedules 117 in memory 107. The set of schedules 117 stored on the zone control panel 101 may include a respective schedule 117 for each zone in the HVAC system 102. Additionally or alternatively, the memory 107 may include a schedule 117 for each interface device 114 in the HVAC system 102. More specifically, the memory 107 may include a suitable data structure, such as one or more registers, a table, and/or a dictionary, mapping a schedule 117 to one or both of a respective interface device 114 or a respective zone. In some embodiments, for example, the memory 107 may map a schedule 117 directly to a respective zone. The memory 107 may then map each interface device 114 associated with the respective zone to the zone and/or to the respective schedule 117 mapped to the zone. In any case, because the zone control panel 101 may communicatively couple directly to one or more interface devices 114 and/or communicatively couple indirectly to one or more additional interface devices 114 via an additional zone control panel 101 communicatively coupled to the zone control panel 101, an interface device 114 may access any one of the set of schedules 117 stored centrally in the zone control panel 101, which, at least in some instances may facilitate reducing communication latency.

Further, in some embodiments, the zone control panel 101 may maintain a default schedule 117 for each of the zones in the HVAC system. In such cases, the zone control panel 101 may maintain the default schedules 117 regardless of whether they are actively used by any of the interface devices 114 in the zones. Accordingly, after receiving a command from an interface device 114, for example, to reset a zone schedule 117 to the default schedule 117 for the zone, the zone control panel 101 may override the schedule 117 running on interface devices 114 associated with the zone with the default schedule 117. Additionally or alternatively, the zone control panel 101 may notify the interface devices 114 associated with the zone and, in response, the interface devices 114 may retrieve the default schedule 117 from the zone control panel 101. Further, while the example above describes resetting a single zone to a default schedule 117, the zone control panel 101 may receive a command to and, thus, may simultaneously reset any suitable number of zones, including each zone in the HVAC system 102.

As described in further detail below, a first interface device 114 may retrieve a schedule associated with a second interface device 114 from the zone control panel 101. A user may then view and/or edit the schedule 117 on the first interface device 114 and, in response to any modifications to the schedule 117, the first interface device 114 may communicate information related to the updated schedule 117 to the zone control panel 101. The zone control panel 101 may then update the corresponding schedule 117 stored in memory 107 based on the received information and may transmit the updated schedule 117 to the second interface device 114.

The first interface device 114 may also create and/or modify the schedule 117 associated with the first device and, in such cases, the first interface device 114 may communicate the updated information related to the schedule 117 to the zone control panel 101. In response, the zone control panel 101 may update the corresponding schedule 117 stored in memory 107 and, because the change for the schedule associated with the first interface device 114 was implemented on the first interface device 114, zone control panel 101 transmission of the updated schedule from the zone control panel 101 back to the first interface device 114 may be obviated. Nevertheless, in some embodiments, the zone control panel 101 may acknowledge that the updated information was received from the first interface device 114 to the first interface device 114 to confirm that both the first interface device 114 and the zone control panel 101 contain identical instances or copies of the schedule 117.

As the first interface device 114 in a first zone may access and/or retrieve the schedule 117 for a second zone, the first interface device 114 may additionally copy the schedule 117 for the second zone to the schedule 117 for the first zone. That is, for example, the first interface device 114 may replace and/or override the schedule 117 running on the first interface device 114 for the first zone directly with the schedule 117 for the second zone. Additionally or alternatively, as described above, the first interface device 114 may modify the schedule 117 for the first zone without replacing the schedule 117.

As discussed above, in some embodiments, communication between devices, such an interface device 114 and the zone control panel 101, may be sent according to a communication protocol, such as RS-485. Further, the devices may communicate and/or refresh some first information, such as a call for heating, cooling, dehumidification, and/or the like, with a regular periodicity, such as every communication cycle. However, second information, such as schedules 117, configuration settings, security passwords, and/or the like, may not change as frequently as the first information and/or a change to the second information may be suitably addressed within a longer time period of the change than with a change to the first information.

Accordingly, to minimize the amount of data requested and/or transmitted between devices in the HVAC system 102, in some embodiments, the devices communicate the second information with the reduced periodicity compared to the regular periodicity used to transmit the first information. Additionally or alternatively, the devices may use one or more flags 119, such as a status bit and/or a status register, that may respectively indicate a state of second information. For example, a flag 119 may indicate whether a schedule 117 for a zone has been modified and, if the schedule has been modified, a data set associated with the flag 119 may be retrieved to determine how the schedule was modified.

As such, a device may read the state of one or more flags 119 to determine the state of the additional information and/or whether to retrieve the additional information. In this manner, the information read and/or processed each communication cycle may be reduced. Further, a device may read a flag 119 according to a periodicity, such as the regular periodicity used to communicate the first or otherwise critical information, and/or may read the flag 119 in response to an event, such as an interrupt, that is triggered by, for example, the state of the flag 119 changing.

While the illustrated embodiment includes one or more flags 119, which may each be mapped to a respective interface device 114, stored on the zone control panel 101, the flags may additionally or alternatively be stored in an interface device 114. In such cases, an interface device 114 may include a set of one or more flags 119 each mapped to a respective data set used by the interface device 114 and shared with another device, such as the zone control panel 101 and/or an additional interface device 114. Accordingly, an additional interface device 114 may include an additional set of one or more flags 119. In any case, a device, such as an interface device 114 and/or a zone control panel 101, may read the state of a flag 119 from a suitable location and, in some cases, the zone control panel 101 may relay the state of a flag 119 from a first interface device 114 to a second interface device 114.

In this manner, information related to, for example, the one or more schedules 117 in the HVAC system 102, may rapidly be communicated between devices, such as interface devices 114 and/or the zone control panel 101. Further, in some embodiments, the zone control panel 101 may use the set of schedules 117 to determine control commands to send to an interface device 114 and/or the HVAC equipment 116. That is, for example, the microcontroller 104 may determine control commands based on a combination of a schedule for a zone and/or the set of schedules in the HVAC system 102, an input received from an interface device 114, and/or operational parameters, such as speed, temperature, and/or pressure, indicated by the HVAC equipment 116 and/or a standalone sensor.

While the interface device 114 is described above as determining calls for heating, cooling, and/or the like based on the schedule run on the interface device 114, in some embodiments, the interface device 114 may send raw data, such as one or more detected climate conditions, to the zone control panel 101 and the microcontroller 104 may determine a suitable call for heating, cooling, and/or the like as it determines a suitable control command. Additionally or alternatively, the microcontroller 104 may determine additional information used to determine a control command, such the temperature difference between a setpoint and a sensed temperature that results in a call for conditioning, based on the schedules 117 of one or more zones.

Figure 6:
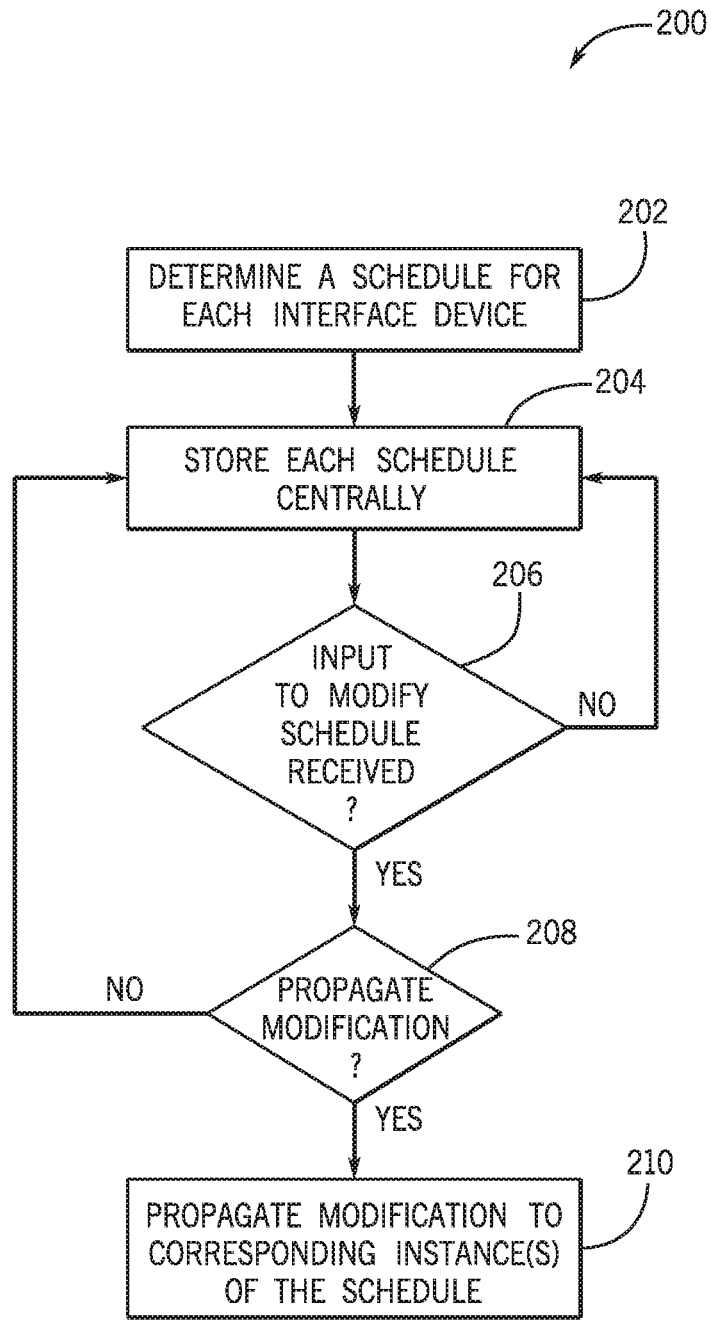
FIG. 6 is a flow diagram of a process maintaining information related to a set of the schedules at a zone control panel, in accordance with an embodiment of the present disclosure.

Turning now to FIG. 6, an example of a process 200 for suitably maintaining information related to a set of schedules 117 at a zone control panel 101 is described. Generally, the process 200 includes determining a schedule for each interface device 114 (process block 202), storing each of the schedules centrally at the zone control panel 101 (process block 204), determining whether a schedule in the set of stored schedules has been modified (decision block 206), if a modification to at least one of the set of stored schedules has been received, determining whether to propagate the modification (decision block 208), and if the modification is to be propagated, propagating the modification to corresponding instance(s) of the schedule 117 (process block 210).

Although the following description of the process 200 is described in a particular order, which represents a particular embodiment, it should be noted that the process 200 may be performed in any suitable order. Additionally, embodiments of the process 200 may omit process blocks and/or include suitable additional process blocks. Moreover, in some embodiments, the process 200 may be implemented at least in part by executing instructions stored in a tangible, non-transitory, computer-readable medium, such as memory 107, using processing circuitry, such as processor 105.

In any case, during initialization and/or after a reset of the HVAC system 102, the zone control panel 101, an interface device 114, and/or HVAC equipment 116, the zone control panel 101 may determine a schedule 117 suitable for and/or used by each respective interface device 114 (process block 202). In some embodiments, a system integrator, a manufacturer, and/or a technician may initialize an interface device 114 with a default schedule 117 and/or default system settings that may be used to determine a schedule 117. In some cases, for example, the default system settings may include a default schedule 117 for a zone, which may be mapped to a respective interface device 114 associated with and/or operating within the zone. Thus, in some embodiments, the zone control panel 101 may request and/or access the respective schedule 117 on each of the interface devices 114 in the HVAC system 102 via, for example, the communication buses 110. Additionally or alternatively, the system integrator, manufacturer, and/or the technician may initialize the zone control panel 101 with the default schedules 117 of each of the interface devices 114.

After determining a schedule 117 associated with an interface device 114, the zone control panel 101 may store the schedule 117 centrally relative to the interface devices 114 in the HVAC system 102, for example, in memory 107 of the zone control panel 101 (process block 204). Accordingly, the memory 107 may include a suitable data structure, such as one or more registers, a table, and/or a dictionary, mapping the schedule 117 to one or both of an interface device 114 and/or a zone. In some embodiments, for example, the memory 107 may map a schedule 117 to a zone. The memory 107 may then map each interface device 114 implemented to control the zone and/or associated with the zone to the zone and/or to the schedule 117 for the zone.

The zone control panel 101 may then determine whether a schedule 117 stored in memory 107 has been modified and/or whether a new schedule 117 has been created (decision block 206). The zone control panel 101 and/or the interface devices 114 may include one or more flags 119, which may be stored in memory 107, that may indicate whether a schedule 117 has been modified. That is, for example, as described in further detail below, after receiving an input to update a schedule 117, an interface device 114 may enable a flag 119 on one or both of the interface device 114 and the zone control panel 101 such that based on the state of the flag 119, the zone control panel 101 may determine whether the schedule 117 has been modified. Accordingly, in some embodiments, the zone control panel 101 may read the state of the flag 119 on one or both of the zone control panel 101 and the interface device 114 to determine whether a schedule 117 has been modified.

Based on a regular interval, the zone control panel 101 may periodically determine or poll whether a modification to a schedule 117 has been made. That is, for example, the zone control panel 101 may periodically read the state of a suitable flag 119 corresponding to the schedule 117. If the zone control panel 101 determines that a modification has not been made to a schedule 117, the zone control panel 101 may check for a modification of a schedule 117 again after the interval has elapsed. Additionally or alternatively, the zone control panel 101 may determine whether a modification to a schedule 117 has been made in response to one or more events or interrupts. For example, in some embodiments, when the state of the flag 119 is changed, an event may be automatically triggered to notify the zone control panel 101 that a schedule 117 has been modified. In such cases, the zone control panel 101 may then respond to the event by updating an instance of the schedule 117 stored at the zone control panel 101, as will be described in more below.

If the zone control panel 101 determines that a schedule has been modified, which may be indicated by an enabled or active flag 119, the zone control panel 101 may then determine, at decision block 208, whether to propagate the modification. More specifically, the zone control panel 101 may determine whether to update a corresponding instance of the schedule 117 in memory 107 and/or whether to notify an additional interface device 114 to update another instance of the schedule 117 used by the additional interface device 114. In some embodiments, for example, the zone control panel 101 may, after determining that the schedule 117 has been modified, determine how the schedule 117 was modified. To do so, the zone control panel 101 may access a portion of or the entire schedule 117 from the interface device 114 that modified the schedule 117 and may compare the portion or entire schedule 117 to the corresponding copy of the portion or entire schedule 117 stored in the zone control panel 101.

If, based on the comparison, the zone control panel 101 determines that the corresponding instance of the schedule 117 does not match the modified instance of the schedule 117 on the interface device 114, the zone control panel 101 may propagate suitable updates to the corresponding instance of the schedule 117 based on the portion of or the entire schedule 117 retrieved from the interface device 114 (process block 210). Additionally or alternatively, the zone control panel 101 may retrieve the input that was used at the interface device 114 to modify the schedule 117. In such cases, the zone control panel 101 may modify the corresponding instance of the schedule stored in memory 107 based on the retrieved input so that the instance of the schedule 117 on the zone control panel 101 matches the modified instance of the schedule 117 on the interface device 114.

Further, after updating the copy of the schedule 117 stored in memory 107, the zone control panel 101 may determine whether any additional devices, such as an additional interface device 114 and/or an additional zone control panel 101, contain additional instances of the schedule 117. If the zone control panel 101 determines that another device contains an additional instance of the schedule 117, the zone control panel 101 may propagate the modifications to the additional instance of the schedule 117. For example, in some embodiments, if a schedule 117 running on a first interface device 114 is modified on the first interface device 114, the zone control panel 101 may, based on the mapping of schedules 117 to zones and/or interface devices 114, determine that the schedule 117 on a second interface device 114 corresponding to the same zone as the first interface device 114 may be updated so that each of the interface devices 114 in the same zone are running on the same schedule.

Further, in some embodiments, the zone control panel 101 may determine that a schedule running on a first interface device 114 in a first zone was modified by a second interface device 114 in a second zone and/or by a mobile device. In such cases, the zone control panel 101 may determine that the modifications implemented and/or received at the second interface device 114 may be propagated to the schedule 117 running on the first interface device 114 and/or any additional interface device 114 in the first zone.

As described in further detail below, to propagate the schedule modifications to an additional device, such as an additional interface device 114 and/or an additional zone control panel 101, the zone control panel 101 may update the state of a flag 119 and/or enable the flag 119 to notify the additional device of the modifications. In such cases, the additional device may then retrieve the modifications and update its instance of the schedule 117 based on the modifications. Additionally or alternatively, the zone control panel 101 may send the schedule modifications directly to the additional device.

Figure 7:
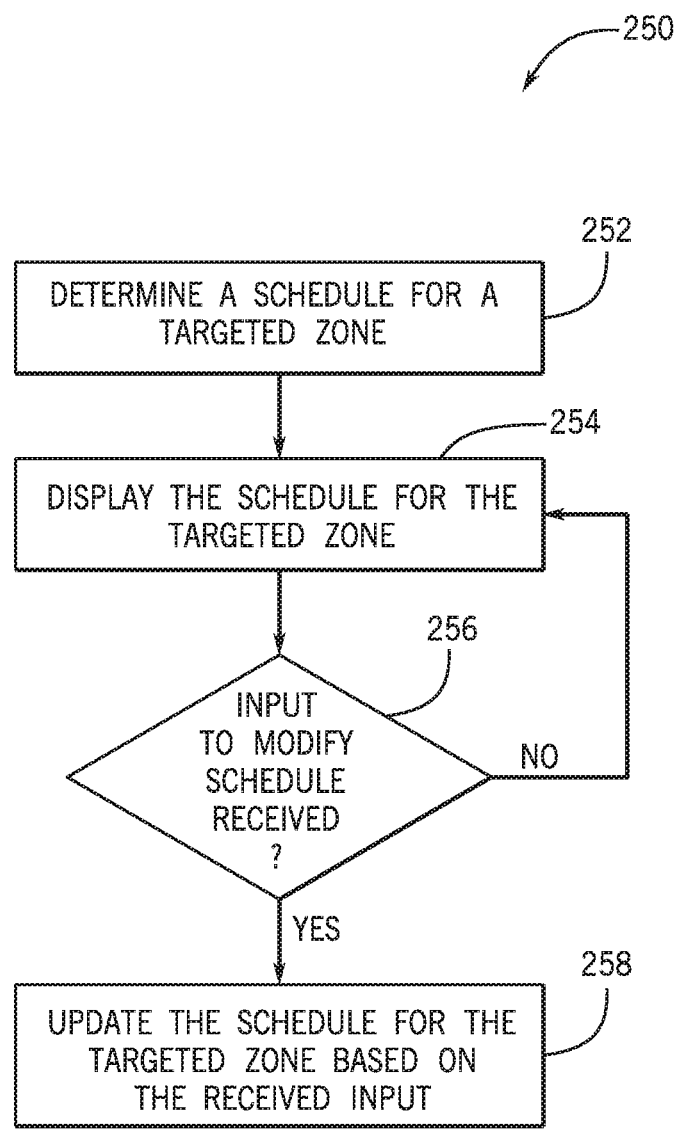
FIG. 7 flow diagram of a process for interacting with a schedule at an interface device in the HVAC system of FIG. 5 based on an input received at the interface device, in accordance with an embodiment of the present disclosure.

Turning now to FIG. 7, an example of a process 250 for interacting with a schedule 117 at an interface device 114 based on an input received at the interface device 114 is described. Generally, the process 250 includes determining a schedule for a targeted zone (process block 252), displaying the schedule for the targeted zone (process block 254), determining whether an input to modify the schedule 117 for the targeted zone has been received (decision block 256), and when an input to modify the schedule 117 for the targeted zone has been received, updating the schedule 117 for the targeted zone based on the received input (process block 258).

Although the following description of the process 250 is described in a particular order, which represents a particular embodiment, it should be noted that the process 250 may be performed in any suitable order. Additionally, embodiments of the process 250 may omit process blocks and/or include suitable additional process blocks. Moreover, in some embodiments, the process 250 may be implemented at least in part by executing instructions stored in a tangible, non-transitory, computer-readable medium, such as memory 107, using processing circuitry, such as processor 105.

Further, in some embodiments, the process 250 may be initiated in response to a request to view, create, and/or modify a schedule 117 for the targeted zone. In some embodiments, the request may be received at an interface device 114 via, for example, the display 120 and/or one or more input structures 122. Further, the request may specify a targeted zone corresponding to the interface device 114 that received the request or to an additional zone.

In the case that the targeted zone corresponds to the interface device 114, determining the schedule 117 for the targeted zone, at process block 252, may involve retrieving the schedule 117 stored and/or running on the interface device 114 from memory 107 on the interface device 114. In the case that the targeted zone does not correspond to the interface device 114, determining the schedule 117 for the targeted zone, at process block 252, may involve retrieving the schedule 117 from the zone control panel 101. That is, for example, if a schedule 117 for a first zone is requested from an interface device 114 at a second zone, the interface device 114 may request and/or access an instance of the schedule 117 from the zone control panel 101, which may reduce the latency involved with requesting an instance of the schedule 117 from an additional interface device 114 in the first zone.

After the schedule for the targeted zone is determined, the interface device 114 may display the schedule for the targeted zone (process block 254). Accordingly, the interface device 114 may output the schedule 117 to a display 120. In some embodiments, the display 120 may be an electronic display, such as a liquid crystal display (LCD), an organic light emitting diode (OLED) display, and/or the like.

After displaying the schedule 117, the interface device 114 may determine whether an input to modify the schedule 117 for the targeted zone has been received (decision block 256). As discussed above, the display size may vary between different interface devices 114 and, as a result, the options and/or actions available to interact with the schedule 117 may vary between different interface devices 114. The options and/or actions available to interact with the schedule 117 may include, for example, viewing a schedule 117 for the zone associated with the interface device 114, viewing a schedule for a zone not associated with the interface device 114, modifying a schedule 117, copying a schedule 117 from another zone, and/or the like. In some embodiments, however, a first interface device 114 may only provide a subset of these options and/or actions, such as viewing a schedule 117 for the zone associated with the interface device 114 and viewing a schedule 117 for a zone not associated with the interface device 114, while a second interface device 114 may include each of the options and/or actions listed above.

Accordingly, in some embodiments, the interface device 114 displaying the retrieved schedule 117 for the targeted zone may block inputs from modifying the retrieved schedule 117. In such embodiments, for example, the interface device 114 may lack suitable input structures 122, such as a keyboard, to receive the input. Accordingly, the interface device 114 may continue to display the retrieved schedule 117 for the targeted zone, at process block 254, for example, until a request to display a schedule 117 for an additional or different zone is received.

On the other hand, in some embodiments, the interface device 114 may determine that an input to modify the displayed schedule 117 has been received in response to receipt of user input signals from one or more input structures of the interface device 114. For example, the interface device 114 may receive a request to modify, copy, and/or create a schedule 117 via an input from a button, such as a push button and/or an electromechanical button, a keyboard, and/or a touch screen display, communicatively coupled to the interface device 114. In such embodiments, at process block 258, the interface device 114 may update the retrieved schedule based on the received input.

As discussed in greater detail below, in some embodiments, the interface device 114 may update an instance of the schedule 117 stored on the interface device 114, the zone control panel 101, and/or an additional interface device 114 based on the input and the targeted zone. That is, for example, the interface device 114 may apply changes to the schedule 117 to a local instance of the schedule 117 running on the interface device 114. Additionally or alternatively, the interface device 114 may communicate the changes to the schedule 117 to the zone control panel 101. In such cases, the zone control panel 101 may then determine whether to propagate the changes to an additional interface device 114 in the targeted zone and/or an additional zone and may communicate the changes the additional interface device 114.

Figure 8:
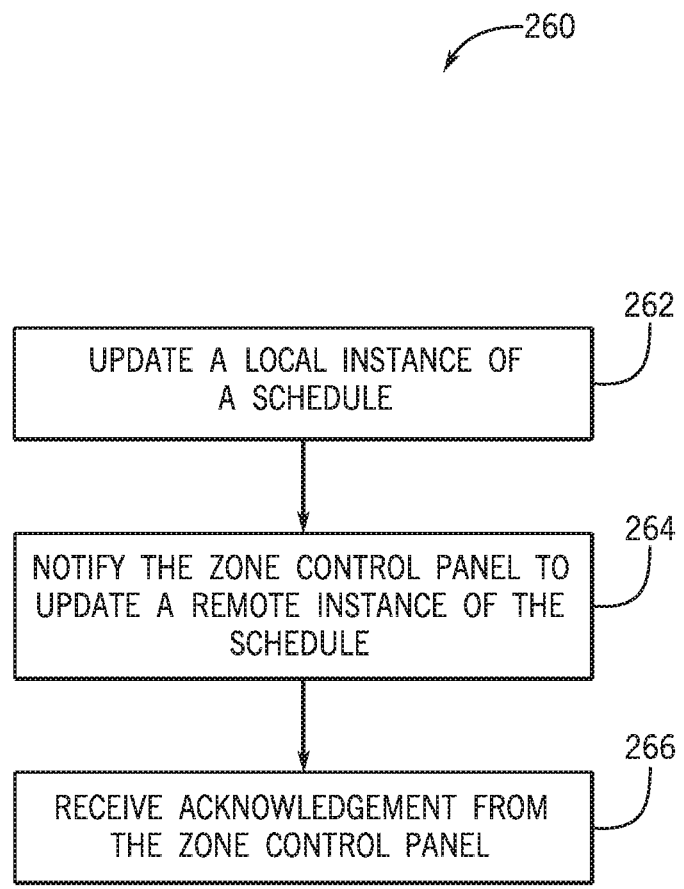
FIG. 8 is a flow diagram of a process for updating a schedule based on an input received at an interface device in the HVAC system of FIG. 5, in accordance with an embodiment of the present disclosure.

To help illustrate, an example of a process 260 for updating the retrieved schedule 117 based on a received input is illustrated in FIG. 8. Generally, the process 260 includes updating a local instance of the schedule 117 (process block 262), notifying the zone control panel 101 to update a remote instance of the schedule 117 (process block 264), and receiving an acknowledgement from the zone control panel 101 (process block 266).

Although the following description of the process 260 is described in a particular order, which represents a particular embodiment, it should be noted that the process 260 may be performed in any suitable order. Additionally, embodiments of the process 260 may omit process blocks and/or include suitable additional process blocks. Moreover, in some embodiments, the process 260 may be implemented at least in part by executing instructions stored in a tangible, non-transitory, computer-readable medium, such as memory 107, using processing circuitry, such as processor 105.

Updating the local instance of the schedule 117, at process block 262, may vary depending on the interface device 114 used to update the schedule 117. For example, a first interface device 114 located in a first zone corresponding to the schedule 117 may include a local instance of the schedule 117 stored in memory 107 of the first interface device 114 so that the first interface device 114 may operate based at least in part on the schedule 117. In such embodiments, after receiving an input at the first interface device 114 to update the schedule 117, updating the local instance of the schedule 117 may involve updating the local instance of the schedule 117 stored in memory 107 of the first interface device 114.

On the other hand, a second interface device 114 located in a second zone that does not correspond to the schedule 117 may not include an instance of the schedule 117 stored in memory 107 of the second interface device 114, as the second interface device 114 may operate based in part on an additional schedule 117 corresponding to the second zone. In such cases, as described above, before receiving an input to update the schedule 117 at the second interface device 114, the second interface device 114 may retrieve the schedule 117 from the zone control panel 101. Accordingly, the second interface device 114 may maintain a temporary local instance of the schedule 117 and, to update the local instance of the schedule 117 displayed, but not used by the second interface device 114, the second interface device 114 may update the temporary local instance of the schedule 117.

In any case, after updating the local instance of the schedule 117, the interface device 114 may notify the zone control panel, at process block 264, to update a remote instance of the schedule 117 on the zone control panel 101. That is, for example, as described in further detail below, the interface device 114 may enable a flag 119, such as a status bit and/or a status register, to indicate to the zone control panel 101 that updated information is available with respect to the schedule 117. Further, in some embodiments, the interface device 114 may update a register and/or a data structure with information related to the updates made to the local instance of the schedule 117 and/or to the received input used to update the local instance of the schedule 117. As such, the interface device 114 may transmit this information and/or facilitate the zone control panel 101 accessing the register and/or data structure to retrieve the information. In other words, in some embodiments, the interface device 114 may provide suitable information to the zone control panel 101 to propagate an update to a schedule 117 from the interface device 114 to the zone control panel 101 and/or to any additional interface devices 114 that may use the schedule 117, such as an additional interface device 114 associated with the zone corresponding to the schedule 117.

After notifying the zone control panel 101 to update the remote instance of the schedule 117, at process block 266, the interface device 114 may receive a response and/or an acknowledgement from the zone control panel 101. That is, for example, the zone control panel 101 may confirm receipt of the notification of an update to the schedule and/or may confirm that the update has been propagated to instances of the schedule 117 on the zone control panel 101 and/or additional interface devices 114. In some embodiments, for example, the zone control panel 101 may disable the flag 119 to acknowledge receipt of the notification. In any case, the interface device 114 may monitor the response from the zone control panel 101 to ensure that each zone control panel 101 and/or interface device 114 in the HVAC system 102 maintains and/or is running on the same version of the schedule 117.

Further, in some embodiments, while the interface device 114 may have previously updated a local instance of the schedule 117, the interface device 114 may not use and/or run the updated instance of the schedule 117 until each of the zone control panels 101 and/or interface devices 114 in the HVAC system 102 storing an instance of the schedule 117 have updated the respective stored instance of the schedule 117. That is, for example, while the interface device 114 may maintain the updates for the instance of the schedule, the interface device 114 may continue to use an unedited instance of the schedule 117 until an acknowledgement of the updates successfully propagating to the zone control panel 101 and/or to an additional device is received. In such embodiments, the interface device 114 may implement the updates to the schedule in response to receiving the acknowledgement. Additionally or alternatively, the interface device 114 may maintain a temporary copy of the unedited instance of the schedule 117 and may override this temporary copy with the updated instance of the schedule 117 in response to receiving the acknowledgement. Accordingly, in such cases, different devices in the HVAC system may not maintain different revisions and/or versions of the schedule 117.

Additionally or alternatively, in some embodiments, the interface device 114 may use the updated local instance of the schedule 117 immediately and/or regardless of the state of the instances of the schedule 117 on other devices. In such cases, a conflict between instances of the schedule 117 may arise if, before a remote instance of the schedule 117 is updated on an additional device, an input is received at the additional device to update the schedule 117. In such cases, the latest revision of the schedule 117 may take priority over previous revisions of the schedule 117. For example, if a first revision to a schedule 117 is made on a first interface device 114 and before the changes dictated by the revision to the schedule 117 are implemented on a second interface device 114, a second revision to the schedule 117 is made on the second interface device 114, the second revision of the schedule 117, which may lack any of the changes dictated by the first revision, may be used by the second interface device 114 and transmitted to the zone control panel 101 and/or the first interface device 114 so that the second revision of the schedule 117 is used on suitable devices throughout the HVAC system 102.

Figure 9:
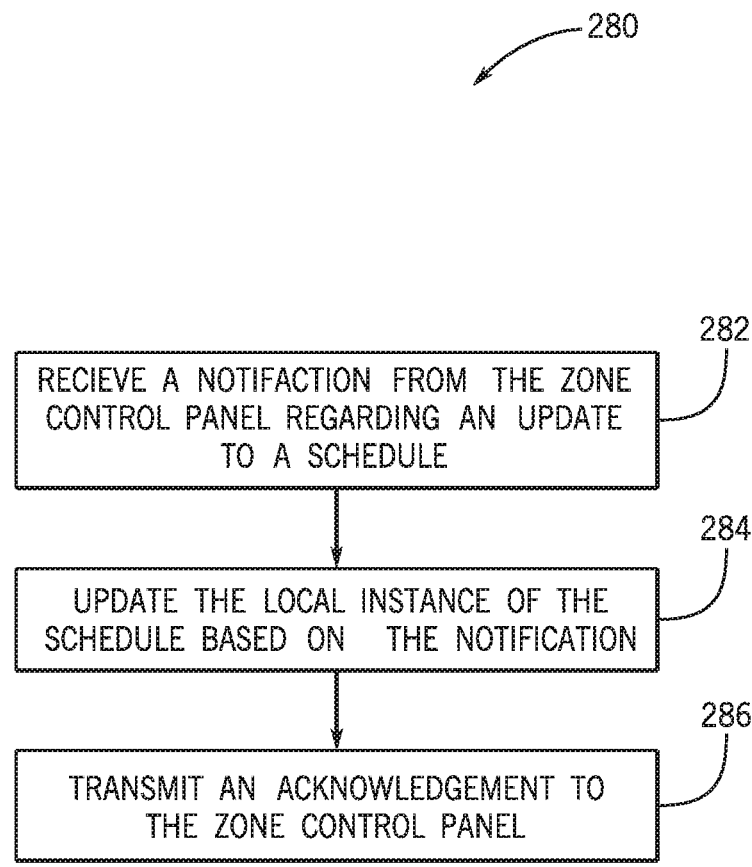
FIG. 9 is flow diagram of a process for updating an instance of a schedule on a device in the HVAC system of FIG. 5 based on an information from a zone control panel, in accordance with an embodiment of the present disclosure.

Turning now to FIG. 9, an example of a process 280 to update an instance of a schedule 117 on a device, such as an interface device 114, based on an information from the zone control panel 101 is illustrated. Generally, the process 280 includes receiving a notification from the zone control panel

101 regarding an update to the schedule 117 (process block 282), updating the local instance of the schedule 117 based on the notification (process block 284), and transmitting an acknowledgement to the zone control panel 101 (process block 286).

Although the following description of the process 280 is described in a particular order, which represents a particular embodiment, it should be noted that the process 280 may be performed in any suitable order. Additionally, embodiments of the process 280 may omit process blocks and/or include suitable additional process blocks. Moreover, in some embodiments, the process 280 may be implemented at least in part by executing instructions stored in a tangible, non-transitory, computer-readable medium, such as memory 107, using processing circuitry, such as processor 105.

As described herein, the zone control panel 101 may propagate information received from a first device to an additional device in the HVAC system 102. Accordingly, to receive information to update and/or modify an instance of a schedule 117 on an interface device 114, at process block 282, the interface device 114 may receive a notification regarding the update to the schedule 117 from the zone control panel 101. In some embodiments, the zone control panel 101 may transmit the notification by changing a state of a flag 119. Accordingly, to receive the notification, the interface device 114 may periodically determine the state of the flag 119 and/or, if the change of the state of the flag 119 automatically triggers an event, the interface device 114 may respond to the event to process the notification.

After receiving the notification, at process block 284, the interface device 114 may update a local instance of the schedule 117 running and/or stored on the interface device 114 based on the notification. In some embodiments, such as embodiments where the change of state of a flag 119 is used to notify the interface device 114, the interface device 114 may retrieve additional information associated with the notification to determine a suitable update for the local instance of the schedule 117. To that end, the interface device 114 may retrieve update information from one or more registers and/or data structures associated with the flag 119 and/or notification. Additionally or alternatively, the zone control panel 101 may send the updates for the schedule 117 directly in the notification. In any case, updating the local instance of the schedule 117 may involve updating memory 107 where the local instance of the schedule 117 is stored to correspond to updated schedule 117 information included and/or referenced by the notification.

To communicate to the zone control panel 101 that the notification has been received and/or that the local instance of schedule 117 on the interface device 114 has been updated based on the notification, at process block 286, the interface device 114 may transmit an acknowledgement to the zone control panel 101. In some embodiments, the acknowledgement may include a message transmitted, for example, over a communication bus 110 to the zone control panel 101. Additionally or alternatively, the interface device 114 may change the state of the flag 119 as an acknowledgement to the zone control panel 101.

Figure 10:
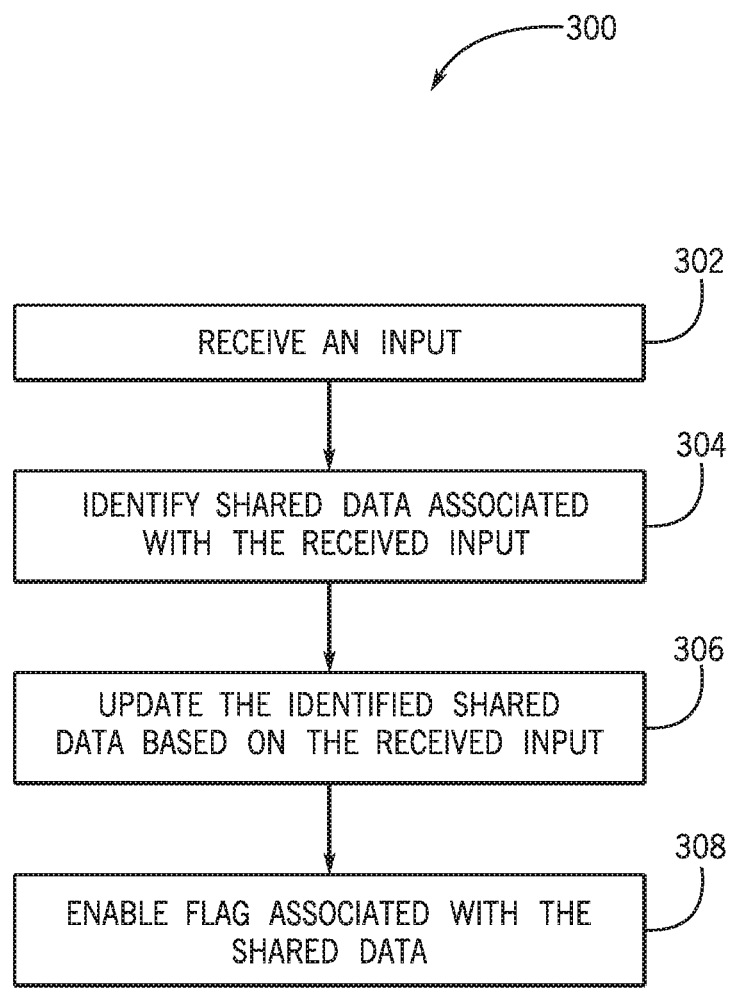
FIG. 10 is a flow diagram for updating information shared or used by multiple devices in the HVAC system of FIG. 5, in accordance with an embodiment of the present disclosure.

Turning now to FIG. 10, an example of a process 300 for updating information, such as a schedule 117, shared or used by multiple devices, such as both an interface device 114 and a zone control panel 101, is described. Generally, the process 300 includes receiving an input (process block 302), identifying shared data associated with the received input (process block 304), updating the shared data based on the received input (process block 306), and enabling a flag associated with the shared data (process block 308).

Although the following description of the process 300 is described in a particular order, which represents a particular embodiment, it should be noted that the process 300 may be performed in any suitable order. Additionally, embodiments of the process 300 may omit process blocks and/or include suitable additional process blocks. Moreover, in some embodiments, the process 300 may be implemented at least in part by executing instructions stored in a tangible, non-transitory, computer-readable medium, such as memory 107, using processing circuitry, such as processor 105.

In some embodiments, at process block 302, the interface device 114 may receive an input to update shared data, such as a request to modify a schedule 117. As described herein, the input may be received via one or more input structures 122, such as a pushbutton, an interactive touch screen display, a keyboard, and/or the like, communicatively coupled to the interface device 114. In some embodiments, shared data may include a set of data used and/or referenced by two or more devices, such as interface devices 114, zone control panels 101, and/or a combination thereof. Accordingly, shared data may include a schedule 117 used by two or more interface devices 114 associated with a common zone, a schedule 117 running on an interface device 114 and stored on the zone control panel 101, and/or the like.

After receiving the input, the interface device 114 may identify the shared data associated with the received input (process block 304). The shared data associated with the received input may include shared data that the received input is intended to modify. Accordingly, the received input may include one or more references to the shared data. Further, the shared data may be associated with one or more registers, a table, and/or another suitable data structure that may be accessed by and/or referenced to provide requested information to any of the devices sharing the shared data.

In any case, after identifying the shared data associated with the received input, at process block 306, the interface device 114 may update the identified shared data based on the received input. For example, in the case of an input to update a schedule 117, the interface device 114 may update the shared data associated with the schedule 117 to reflect a requested change in temperature setpoint, the hours of the day associated with a portion of the schedule 117, and/or the like based on the received input.

To indicate to other devices sharing the shared data that the shared data has been modified, at process block 308, the interface device 114 may then enable a flag 119 associated with the shared data. The flag 119 associated with the shared data may represent a status bit and/or a status register that may indicate a state of the shared data. For example, in some embodiments, the flag 119 may indicate whether or not the shared data has been modified from a previous version of the shared data. As such, the flag 119 may indicate to an additional device using and/or referencing the shared data to update an instance of the shared data on the additional device so that each instance of the shared data matches and/or is consistent with each of the other instances of the shared data.

In some embodiments, as illustrated in FIG. 5, the flag 119 may be stored on the zone control panel 101. In such cases, for example, a first interface device 114 sharing data with a second interface device 114 may send a request to enable the flag 119 to the zone control panel 101 so that the second interface device 114 may poll the flag 119 at the zone control panel 101 to determine whether the shared data has been updated. Further, while the zone control panel 101 may include a set of one or more flags 119, the zone control panel 101 may map the flag 119 enabled by the interface device 114 to the interface device 114. Accordingly, the flag 119 may indicate whether information has been received from the interface device 114, while an additional flag 119 mapped to an additional interface device 114 may indicate whether information has been received from the additional interface device 114.

Accordingly, the interface device 114 may change the flag 119 from a first state, which may indicate there is no modification to the shared data (e.g., false), to a second state, which may indicate that there is a modification to the shared data (e.g., true). In some cases the flag 119 may be enabled for a previous modification to the shared data that has not been received and/or acknowledged by an additional device that uses and/or references the shared data. In such cases, the interface device 114 may maintain the flag 119 in the enabled state. In any case, as described in detail below, an additional device using and/or referencing shared data, such as a schedule 117, may determine the state of the flag 119 associated with the shared data and, based on the state of flag 119, may retrieve modifications to the shared data and/or a modified instance of the shared data in order to update a local instance of the shared data on the additional device.

While a schedule 117 is used as an illustrative example of shared data, shared data may further include information related to a configuration of the HVAC system 102, such as the configuration of zones within the HVAC system 102, the configuration of HVAC equipment 116, and/or the like, and/or any other suitable data used by multiple devices in the HVAC system 102. That is, the descriptions of shared data used herein are intended to be illustrative and not limiting.

Figure 11:
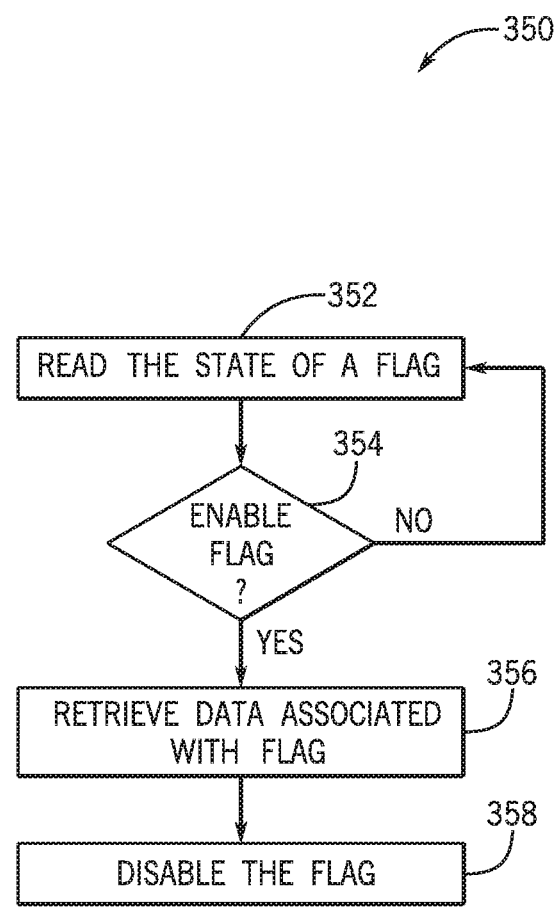
FIG. 11 is a flow diagram of a process updating a first instance of shared data on a first device in the HVAC system of FIG. 5 based on information received from a second device in the HVAC system of FIG. 5 related to a second instance of the shared data, in accordance with an embodiment of the present disclosure.

To help illustrate, FIG. 11 illustrates an example of a process for updating a first instance of shared data on a first device in the HVAC system 102 based on information received from a second device related to a second instance of the shared data. Generally, the process 350 includes reading the state of a flag 119 (process block 352), determining whether the flag 119 is enabled (decision block 354), and if the flag 119 is enabled, retrieving data associated with the flag 119 (process block 356) and disabling and flag 119 (process block 308).

Although the following description of the process 350 is described in a particular order, which represents a particular embodiment, it should be noted that the process 350 may be performed in any suitable order. Additionally, embodiments of the process 350 may omit process blocks and/or include suitable additional process blocks. Moreover, in some embodiments, the process 350 may be implemented at least in part by executing instructions stored in a tangible, non-transitory, computer-readable medium, such as memory 107, using processing circuitry, such as processor 105.

At process block 252, a device, such as the zone control panel 101 and/or an interface device 114, may read the state of a flag 119, such as a status bit and/or a status register, which may indicate whether data associated with the flag 119 has been updated. In some embodiments, the device may read the status of the flag 119 with a certain periodicity, such as every communication cycle, every second, and/or the like. Additionally or alternatively, a changed state of the flag 119 may trigger event, such as an interrupt, in the device so that the device may read the state of the flag 119 in response to the event. Further, the device may include a set of one or more flags 119. To that end, each of the one or more flags 119 may indicate the status of a particular data set, which may correspond to shared data and/or to an instance of shared data on a specific device.

More specifically, in some embodiments, the zone control panel 101 may maintain a set of one or more flags 119, which may each be mapped to a respective interface device 114 and/or to a specific data set used by the respective interface device 114. In such embodiments, a device, such as an interface device 114 and/or an additional zone control panel 101, may read the state of one or more flags 119 mapped to the device on the zone control panel 101 by sending a request to the zone control panel 101 for information regarding the state of the flags 119 and/or by receiving the state of the one or more flags 119 from the zone control panel 101. Further, the zone control panel 101 may read the state of the one or more flags 119 stored on the zone control panel 101 to determine whether any modifications to associated with any of the flags 119 has occurred.

Additionally or alternatively, each device may maintain a set of one or more flags 119 mapped to a specific data set used by the device. In such cases, the zone control panel 101 may read the state of the respective one or more flags 119 on the devices by sending a request to each of the devices for information regarding the state of the flags 119 to determine whether data associated with a flag 119 has been modified. Further, the device may read the state of a flag 119 stored on the device to determine whether data associated with the flag 119 has been modified.

After reading the state of the flag 119, the device may determine whether the flag 119 is enabled (decision block 354). In some embodiments, the state of the flag 119 may be one of a first state, which may represent an enabled flag 119, or a second state, which may represent a disabled flag 119. Accordingly, in such embodiments, determining whether the flag 119 is enabled may involve determining whether the state of the flag 119 is a first state, such as true, and/or may involve comparing the state of the flag 119 to the first state.

Additionally or alternatively, the flag 119 may represent one of several states, which may each be mapped to a respective result and/or associated data in the device. For example, a first state may correspond to a first change in a first data set implemented by a first device, a second state may correspond to the first change in the first data set implemented by a second device, and a third state may correspond to a second change in the first data set implemented by the first device. In such cases, one or more states may correspond to an enabled state. That is, continuing with the example above, the first state, the second state, and the third state may each correspond to the enabled state, as each of the states indicate that a change to a data set has occurred.

If the flag 119 is determined to be enabled, at process block 356, the device may retrieve data associated with the flag. In some embodiments, the data associated with the flag 119 may correspond to data in one or more registers and/or a suitable data structure mapped to the flag 119. The data associated with the flag 119 may depend on the flag 119 itself and/or on the state of the flag 119. The one or more registers and/or the suitable data structure may reside in memory on the device and/or on an additional device. Accordingly, to retrieve data associated with the flag 119, the device may determine where the data associated with the flag 119 resides.

Further, in embodiments where the data associated with the flag 119 resides in memory of the device, the device may read and/or retrieve the data from the memory of the device. Additionally or alternatively, if the data associated with the flag 119 resides on the additional device, the device may access the data on the additional device to retrieve the data from the additional device and/or may send a request to the additional device so that the additional device may transmit the data associated with the flag. Further, as described above, in some embodiments, the state of the flag 119 may map to associated data and/or a result in the device. In such embodiments, the device may determine a mapping of the state of the flag 119 to associated data to retrieve the data associated with the flag.

Based on the retrieved data, the device may perform an action. In some embodiments, for example, the device may add, update, and/or delete information stored on the device based on the retrieved data. As an illustrative example, if the device contains a first instance of a schedule 117 stored in memory, such as memory 107, and the retrieved data contains information related to an input to change the first instance of the schedule 117 that was used to change a second instance of the schedule 117 and/or the portion of the second instance of the schedule 117 changed by the input, the device may update the first instance of the schedule based on the input and/or the portion of the second instance of the schedule 117 so that the first instance of the schedule 117 and the second instance of the schedule 117 match.

Further, in some embodiments, as described above with reference to FIG. 6, the zone control panel 101 may, in response to determining that a flag 119 is enabled and/or retrieving data associated with the flag, propagate information related to the data associated with flag 119 to an additional device at process block 208. In other words, the zone control panel 101 may enable an additional flag 119 to communicate the data associated with the flag 119 to an additional interface device 114. For example, a first interface device 114 may enable a first flag 119 to communicate a modification to a first instance of a schedule 117 to the zone control panel 101. In response to determining that the first flag 119 is enabled, the zone control panel 101 may then update a second instance of the schedule 117 stored in memory 107 and may determine whether any additional devices include an instance of the schedule 117. If, for example, the zone control panel 101 determines that a second interface device 114 includes a third instance of the schedule 117, the zone control panel 101 may enable a second flag 119 to notify the second interface device 114 of the modification to the first instance of the schedule 117.

After retrieving the data associated with the flag 119 and/or performing a suitable action in response to the retrieved data, at process block 358, the device may disable the flag 119. To do so, the device may change the state of the flag 119 to a disabled state, which may indicate to an additional device that the device has processed and/or acknowledged the information indicated by the enabled flag 119 previously detected. Additionally or alternatively, the device may transmit a response to the device that enabled the flag 119 to communicate that the flag 119 has been processed.

If, on the other hand, the state of the flag 119 is not enabled, the device may continue to read the state of the flag 119 periodically and/or based on an interrupt and/or event associated with a change of state of the flag 119. Further, the device may continue to periodically transmit and receive information, such as a call for heating, cooling, dehumidification, and/or the like, at a regular interval.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and air conditioning (HVAC) system, comprising:
 a first zone thermostat configured to operate based at least in part on a first schedule and to store a first instance of the first schedule;
 a zone control panel communicatively coupled to the first zone thermostat, wherein the zone control panel is local to the HVAC system and is configured to:
  provide HVAC control commands to HVAC equipment within the HVAC system, via one or more HVAC system busses, to implement zone input parameters from a corresponding zone thermostat; and
  store a second instance of the first schedule; and
 a second zone thermostat communicatively coupled to the zone control panel and configured to operate based at least in part on a second schedule, wherein, when a first user input requesting to view the first schedule used by the first zone thermostat is received at the second zone thermostat, the second zone thermostat is configured to:
  retrieve, from the zone control panel, the first schedule as a third instance to be stored at the second zone thermostat;
  receive a second user input requesting to modify the first schedule;
  update the third instance of the first schedule stored at the second zone thermostat based in part on the second user input; and
  output first information related to the second user input to the zone control panel to facilitate updating the first instance and the second instance of the first schedule stored in the HVAC system;
 wherein, when the zone control panel receives an indication of a modification to the second instance of the first schedule, and the third instance of the first schedule, as updated based in part on the second user input, is stored at the second zone thermostat:
  the zone control panel is configured to output second information related to the indication to the second zone thermostat; and
  the second zone thermostat is configured to update the third instance of the first schedule stored at the second zone thermostat based at least in part on the second information received from the zone control panel.

2. The HVAC system of claim 1, wherein:
 the zone control panel is configured to update the second instance of the first schedule stored at the zone control panel based at least in part on the first information related to the second user input output from the second zone thermostat; and
 the first zone thermostat is configured to update the first instance of the first schedule stored at the first zone thermostat based at least in part on the first information related to the second user input output from the second zone thermostat.

3. The HVAC system of claim 2, wherein:
 the second zone thermostat is configured to output the first information related to the second user input to the zone control panel; and
 the zone control panel is configured to relay the first information related to the second user input to the first zone thermostat.

4. The HVAC system of claim 2, wherein:
 the zone control panel is configured to output a first acknowledgement after the zone control panel updates the second instance of the first schedule stored at the zone control panel based at least in part on the first information related to the second user input;
the first zone thermostat is configured to output a second acknowledgement after the first zone thermostat updates the first instance stored at the first zone thermostat based at least in part on the first information related to the second user input; and
the second zone thermostat is programmed to determine that each instance of the first schedule stored in the HVAC is updated after the second zone thermostat receives the first acknowledgement and the second acknowledgement.

5. The HVAC system of claim 1, comprising:
first HVAC equipment communicatively coupled to the second zone thermostat, wherein the second zone thermostat comprises a master thermostat configured to communicate first control signals to control operation of the first HVAC equipment; and
second HVAC equipment communicatively coupled to the zone control panel, wherein the zone control panel is configured to communicate second control signals to control operation of the second HVAC equipment.

6. The HVAC system of claim 5, wherein:
the first HVAC equipment comprises one or more HVAC units configured to produce temperature-controlled air; and
the second HVAC equipment comprises one or more air dampers configured to control airflow provided to internal spaces within a building serviced by the HVAC system.

7. The HVAC system of claim 1, wherein:
the second zone thermostat is configured to store a first instance of the second schedule; and
the zone control panel is configured to store a second instance of the second schedule, wherein the zone control panel,
when a third user input requesting to view the second schedule used by the second zone thermostat is received, is configured to:
display a visual representation of the second schedule based at least in part on the second instance of the second schedule stored at the zone control panel;
when a fourth user input requesting to modify the second schedule is received at the zone control panel,
update the second instance of the second schedule stored at the zone control panel based in part on the fourth user input; and
output third information related to the fourth user input to facilitate updating each other instance of the second schedule used by the second zone thermostat stored in the HVAC system.

8. The HVAC system of claim 7, wherein the second zone thermostat is configured to update the first instance of the second schedule stored at the second zone thermostat based at least in part on the third information related to the fourth user input received from the zone control panel.

9. The HVAC system of claim 7, wherein, when a third instance of the second schedule used by the second zone thermostat is stored at the first zone thermostat:
the zone control panel is configured to output the third information related to the fourth user input to the first zone thermostat; and
the first zone thermostat is configured to update the third instance of the second schedule stored at the first zone thermostat based at least in part on the third information related to the fourth user input received from the zone control panel.

10. The HVAC system of claim 7, wherein the first zone thermostat,
when a fifth user input requesting to view the second schedule used by the second zone thermostat is received, is configured to:
retrieve the second schedule from the zone control panel and to store a third instance of the second schedule at the first zone thermostat;
display a visual representation of the second schedule based at least in part on the third instance of the second schedule stored at the first zone thermostat; and
block user inputs received at the first zone thermostat from modifying the second schedule used by the second zone thermostat.

11. The HVAC system of claim 1, wherein the second zone thermostat is configured to output the first information related to the second user input received at the second zone thermostat using a serial transmission protocol.

12. The HVAC system of claim 1, wherein the second zone thermostat comprises a touch screen display configured to:
receive the first user input when a first contact with the touch screen display is detected; and
receive the second user input when a second contact with the touch screen display is detected.

13. The HVAC system of claim 1, wherein the first schedule comprises a first climate condition setpoint mapped to a first time period in the HVAC system and a second climate condition setpoint mapped to a second time period in the HVAC system, wherein, during the first time period, the first zone thermostat is configured to operate based in part on the first climate condition setpoint and, during the second time period, the first thermostat is configured to operate based in part on the second climate condition setpoint.

14. A method for controlling operation of a heating, ventilation, and air conditioning (HVAC) system, comprising:
when a first user input requesting to view a first schedule used by a first zone thermostat in the HVAC system is received at a second zone thermostat in the HVAC system, wherein the first zone thermostat is configured to operate based in part on the first schedule and to store a first instance of the first schedule, and the second zone thermostat is configured to operate based in part on a second schedule:
instructing, using a first controller of the second zone thermostat, the second zone thermostat to retrieve the first schedule from a zone control panel in the HVAC system, wherein the zone control panel is configured to store a second instance of the first schedule, the zone control panel is local to the HVAC system, and the zone control panel is configured to provide HVAC control commands to HVAC equipment within the HVAC system, via one or more HVAC system busses, to implement zone input parameters from a corresponding zone thermostat;
instructing, using the first controller, to store a third instance of the first schedule upon retrieving the first schedule from the zone control panel;
instructing, using the first controller, a first electronic display of the second zone thermostat to display a visual representation of the first schedule based at least in part on the third instance of the first schedule; and when a second user input requesting to modify the first schedule is received at the second zone thermostat:
instructing, using the first controller, the second zone thermostat to update the third instance of the first schedule stored at the second zone thermostat based in part on the second user input;
instructing, using the first controller, the second zone thermostat to output first information related to the second user input to facilitate updating each other instance of the first schedule stored in the HVAC system;
receiving, at the first controller, a first acknowledgement after the zone control panel updates the second instance of the first schedule stored at the zone control panel based at least in part on the first information related to the second input, a second acknowledgement after the first zone thermostat after the first zone thermostat updates the first instance of the first schedule stored at the first zone thermostat based at least in part on the first information related to the second user input, or both; and
determining, using the first controller, that a corresponding instance of the first schedule is updated after receiving the first acknowledgement, the second acknowledgement, or both.

15. The method of claim 14, wherein instructing, using the first controller, the second zone thermostat to update the third instance of the first schedule based in part on the second user input comprises:
replacing, using the first controller, the third instance of the first schedule with a first instance of the second schedule, wherein the second zone thermostat is configured to store the first instance of the second schedule.

16. The method of claim 14, comprising:
when a third user input requesting to view the first schedule is received at the first zone thermostat:
instructing, using a second controller of the first zone thermostat, a second electronic display of the first zone thermostat to display an additional visual representation of the first schedule based at least in part on the first instance of the first schedule; and
when a fourth user input requesting to modify the first schedule is received at the first zone thermostat:
instructing, using the second controller, the first zone thermostat to update the first instance of the first schedule stored at the first zone thermostat based in part on the fourth user input; and
instructing, using the second controller, the first zone thermostat to output second information related to the fourth user input to facilitate updating each other instance of the first schedule.

17. A non-transitory computer-readable medium, comprising instructions executable by at least one processor of a zone control panel in a heating, ventilation, and air conditioning (HVAC) system that, when executed by the at least one processor, cause the at least one processor to:
monitor a first instance of a first schedule stored in a first zone thermostat in the HVAC system, wherein the first zone thermostat is configured to operate based in part on a second schedule;
compare the first instance of the first schedule with a second instance of the first schedule stored at the zone control panel;
determine the second instance of the first schedule does not match with the first instance of the first schedule;
identify a first input causing the first instance of the first schedule to be modified in response to determining the second instance of the first schedule does not match with the first instance of the first schedule;
update the second instance of the first schedule stored at the zone control panel based in part on the first input;
identify a third instance of the first schedule stored on a second zone thermostat in the HVAC system, wherein the second zone thermostat is configured to operate based in part on the first schedule;
compare the third instance of the first schedule stored on the second zone thermostat with the second instance of the first schedule stored at the zone control panel;
determine the third instance of the first schedule does not match with the third instance of the first schedule; and
output first information related to the first input in response to determining the third instance of the first schedule does not match with the third instance of the first schedule, wherein the first information facilitates the second zone thermostat to update the third instance of the first schedule used by the second zone thermostat,
wherein the zone control panel is local to the HVAC system and is configured to provide HVAC control commands to HVAC equipment within the HVAC system, via one or more HVAC system busses, to implement zone input parameters from a corresponding zone thermostat.

18. The non-transitory computer-readable medium of claim 17, wherein the instructions, when executed by the at least one processor, cause the at least one processor to:
identify the third instance of the first schedule stored on the second zone thermostat based in part on a mapping of the first schedule to one or more zone thermostats in the HVAC system.

19. The non-transitory computer-readable medium of claim 17, wherein the instructions, when executed by the at least one processor, cause the at least one processor to:
when a second input requesting to reset the first schedule to a default schedule is received at the zone control panel from the first zone thermostat or the second zone thermostat:
retrieve the default schedule stored at the zone control panel from the zone control panel based at least in part on the second input;
replace the second instance of the first schedule stored at the zone control panel with the default schedule;
identify the third instance of the first schedule stored on the second zone thermostat; and
output second information related to the second input to facilitate resetting the third instance of the first schedule used by the second zone thermostat to the default schedule.

20. The non-transitory computer-readable medium of claim 17, wherein the instructions, when executed by the at least one processor, cause the at least one processor to:
when a second input requesting to modify the first schedule is received at the zone control panel before the at least one processor updates the first second instance of the first schedule stored at the zone control panel based in part on the first input:
update the second instance of the first schedule based on only the second input;
identify the third instance of the first schedule stored on the second zone thermostat; and output second information related to only the second input to facilitate updating the third instance of the first schedule used by the second zone thermostat.

\* \* \* \* \*